US008949108B2

(12) United States Patent
Cao et al.

(10) Patent No.: US 8,949,108 B2
(45) Date of Patent: Feb. 3, 2015

(54) DOCUMENT PROCESSING, TEMPLATE GENERATION AND CONCEPT LIBRARY GENERATION METHOD AND APPARATUS

(75) Inventors: Feng Cao, Beijing (CN); Gang Hu, Beijing (CN); Jing Li, Beijing (CN); Zhong Li, Beijing (CN); Yong Liang Ren, Beijing (CN); Xiao Yuan Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 13/118,730

(22) Filed: May 31, 2011

(65) Prior Publication Data

US 2011/0295595 A1 Dec. 1, 2011

(30) Foreign Application Priority Data

May 31, 2010 (CN) .......................... 2010 1 0188569

(51) Int. Cl.
*G06F 17/27* (2006.01)
*G06F 17/22* (2006.01)
*G06F 17/24* (2006.01)

(52) U.S. Cl.
CPC ........ *G06F 17/2785* (2013.01); *G06F 17/2247* (2013.01); *G06F 17/248* (2013.01)
USPC .............................................................. 704/9

(58) Field of Classification Search
CPC ............ G06F 17/2247; G06F 17/2785; G06F 17/248; G06F 17/27
USPC .............................................................. 704/9
See application file for complete search history.

(56) References Cited

U.S. PATENT DOCUMENTS

| | | | | |
|---|---|---|---|---|
| 5,181,163 A * | 1/1993 | Nakajima et al. | ............... | 704/10 |
| 5,495,567 A * | 2/1996 | Iizawa et al. | .................. | 715/762 |
| 5,696,916 A * | 12/1997 | Yamazaki et al. | ............ | 715/853 |
| 5,860,059 A * | 1/1999 | Aust et al. | ..................... | 704/231 |
| 7,360,151 B1 * | 4/2008 | Froloff | .......................... | 715/255 |
| 7,483,924 B2 | 1/2009 | Cohen et al. | | |
| 7,487,095 B2 * | 2/2009 | Hill et al. | ...................... | 704/275 |
| 7,492,949 B1 * | 2/2009 | Jamieson | ...................... | 382/217 |
| 7,512,633 B2 | 3/2009 | Cohen et al. | | |
| 7,627,536 B2 * | 12/2009 | Kacmarcik | ..................... | 706/11 |

(Continued)

FOREIGN PATENT DOCUMENTS

| | | |
|---|---|---|
| CN | 1379351 A | 11/2002 |
| CN | 101452503 A | 6/2009 |

OTHER PUBLICATIONS

Intelligent Electronic Patient Record (EPR) writing system based on XML, Mar. 31, 2004, English Abstract.

(Continued)

*Primary Examiner* — Eric Yen
(74) *Attorney, Agent, or Firm* — Jennifer R. Davis; Reza Sarbakhsh

(57) ABSTRACT

The present invention relates to document processing method and apparatus which can edit a natural language and generate a machine-processable document; a template generating method and apparatus which can be used for document processing method and apparatus; a concept library generating method and apparatus which can be used for the document processing method and apparatus and the template generating method and apparatus. The present invention provided a possibility for semantic interaction of documents in different systems and enhances efficiency.

20 Claims, 12 Drawing Sheets

(56) References Cited

U.S. PATENT DOCUMENTS

| | | | | |
|---|---|---|---|---|
| 7,627,861 | B2 * | 12/2009 | Smith et al. | 717/144 |
| 7,836,437 | B2 * | 11/2010 | Kacmarcik | 717/139 |
| 8,155,946 | B2 * | 4/2012 | Hudson et al. | 704/4 |
| 8,442,940 | B1 * | 5/2013 | Faletti et al. | 707/610 |
| 2002/0010574 | A1 * | 1/2002 | Tsourikov et al. | 704/9 |
| 2002/0042707 | A1 * | 4/2002 | Zhao et al. | 704/9 |
| 2002/0103811 | A1 | 8/2002 | Fankhauser et al. | |
| 2002/0111786 | A1 * | 8/2002 | Sugeno et al. | 704/1 |
| 2003/0004915 | A1 * | 1/2003 | Lin et al. | 707/1 |
| 2003/0115083 | A1 | 6/2003 | Masarie, Jr. et al. | |
| 2004/0153305 | A1 * | 8/2004 | Enescu et al. | 704/2 |
| 2005/0010428 | A1 * | 1/2005 | Bergeron et al. | 705/1 |
| 2005/0055241 | A1 | 3/2005 | Horstmann | |
| 2005/0075942 | A1 * | 4/2005 | Hofer et al. | 705/26 |
| 2005/0278164 | A1 * | 12/2005 | Hudson et al. | 704/4 |
| 2007/0005643 | A1 * | 1/2007 | Korman | 707/104.1 |
| 2007/0016450 | A1 | 1/2007 | Bhora et al. | |
| 2007/0083359 | A1 * | 4/2007 | Bender | 704/9 |
| 2007/0260492 | A1 | 11/2007 | Feied et al. | |
| 2008/0140389 | A1 * | 6/2008 | Funakoshi et al. | 704/9 |
| 2009/0083034 | A1 * | 3/2009 | Hernandez et al. | 704/251 |
| 2009/0198514 | A1 | 8/2009 | Rhodes | |
| 2010/0083175 | A1 | 4/2010 | Berg | |

OTHER PUBLICATIONS

Alschuler, Clinical Document Architecture CDA Introduction, EICP, 2005.

Jung, et al., Toward the Automatic Generation of the Entry Level CDA Documents, J Kor Soc Med Informatics, 2009, 15(1): 141-151.

Schuler, et al., A Generic. Web-based Clinical Information System Architecture Using HL7 CDA: Successful Implementation in Dermatological Routine Care, MedInfo 2007.

Ferranti, et al., The Clinical Document Architecture and the Continuity of Care Record. J of American Medical Informatics Association, vol. 13, #3, May/Jun. 2006.

Piggott, et al., Reporting Experiences from Using the HL7 Clinical Document Architecture in the PICNIC, PICNIC, IST-1999-10345.

Ringholm, Common issues found in implementations of the HL7 Clinical Document Architecture (CDA), http://ringholm.de/docs/03020_en_HL7_CDA_Common_Issues_error_html.

Yuwen, et al, Standardizing the Medical Data in China by CDA, 2009 Fourth International Conference on Computer Sciences and Convergence Information Technology, 2009.

* cited by examiner

```
<title>主诉</title>
<text>右侧肢体乏力四月余. 左侧胸部疼痛三天伴心悸. 心包积液</text>
- <entry>
  - <observation classCode="OBS" moodCode="EVN">
    - <code code="300224836" codeSystem="2.16.840.1.113883.6.96" codeSystemName="SCT" codeSystemVersion="20070731" displayName="Weakness of limb
        (finding)">
        <originalText>肢体乏力</originalText>
      - <qualifier>
          <name code="300254216" displayName="Finding site (attribute)" />
        - <value code="300150205" codeSystem="2.16.840.1.113883.6.96" codeSystemName="SCT" codeSystemVersion="20070731" displayName="Entire limb
            (body structure)">
            <originalText>右侧肢体</originalText>
          - <qualifier>
              <name code="300183522" displayName="Laterality (attribute)" />
            - <value code="300159451" codeSystem="2.16.840.1.113883.6.96" codeSystemName="SCT" codeSystemVersion="20070731"
                displayName="Right (qualifier value)">
                <originalText>右侧</originalText>
              </value>
            </qualifier>
          </value>
        </qualifier>
      - <qualifier>
          <name code="555555555" displayName="BINDING VALUE" />
        - <value code="300328258" codeSystem="2.16.840.1.113883.6.96" codeSystemName="SCT" codeSystemVersion="20070731" displayName="Four
            (qualifier value)">
            <originalText>四</originalText>
          - <qualifier>
              <name code="555555556" displayName="HAS UNIT" />
            - <value code="300173444" codeSystem="2.16.840.1.113883.6.96" codeSystemName="SCT" codeSystemVersion="20070731"
                displayName="month (qualifier value)">
                <originalText>月</originalText>
              </value>
            </qualifier>
          </value>
        </qualifier>
      </code>
      <text>右侧肢体乏力四月余.</text>
    </observation>
  </entry>
```

FIG. 5

DOCUMENT PROCESSING, TEMPLATE GENERATION AND CONCEPT LIBRARY GENERATION METHOD AND APPARATUS

CROSS-REFERENCE TO RELATED APPLICATION

This application claims priority under 35 U.S.C. §119 from Chinese Patent Application No. 201010188569.7 filed May 31, 2010, the entire contents of which are incorporated herein by reference.

BACKGROUND OF THE INVENTION

1. Technical Field

The present application relates generally to information processing. More specifically, the invention relates to methods and apparatus for document processing, template generation, and concept library generation.

2. Related Art

Various tools for editing natural language document on an information processing apparatus such as computer, mobile apparatus and PDA have been known in the art. From the point of view of text entry, document editing, document exchanging and document output, all texts used in a document are coded. For example, ASCII codes, including English letters and digits, as well as other signs and codes generated by various Chinese character coding schemes, to facilitate identification and processing of the information processing apparatus.

In practice, there exists a need for enhancing exchangeability of documents at a semantic level. That is, there exists a need to make the information processing apparatus able to "understand" and exchange semantics expressed by documents, instead of the texts themselves.

SUMMARY OF THE INVENTION

One aspect of the present invention provides a document processing method, including: acquiring a template having at least one semantic item, where candidate values of the semantic item and relations among semantic items are associated with machine-processable semantic codes and the template is associated with a corresponding natural language expression mode; receiving an input value for the semantic item of the template; generating a machine-processable document including the machine-processable semantic codes based on the input value, the relation among the semantic items, and the machine-processable semantic codes as associated; and generating a natural language document including the input value based on the input value and the natural language expression mode.

Another aspect of the present invention provides a document processing device, including means for acquiring a template having at least one semantic item, where a candidate value of each semantic item and a relation among semantic items are associated with machine-processable semantic codes and the template is associated with a corresponding natural language expression mode; semantic item input means for receiving an input value for the semantic item of the template; machine-processable document generating means for generating a machine-processable document including the machine-processable semantic codes based on the input value, the relation among the semantic items, and the machine-processable semantic codes as associated; and natural language document generating means for generating a natural language document including the input value based on the input value and the natural language expression mode.

Another aspect of the present invention provides a method for generating a template used by the above mentioned document processing method or device from a natural language document sample, including: identifying a core concept and other sentence elements in the natural language document sample; determining a relation between a current concept of each sentence element and the core concept; searching in the concept library for a qualifier concept, a relation between the qualifier concept and the core concept being identical to the relation between the current concept and the core concept; generating a semantic item of the template based on a searching result; and generating a candidate value of the semantic item based on the qualifier concept having the identical relation in the case that the qualifier concept having the identical relation exists.

Another aspect of the present invention provides a device for generating a template from a natural language document sample, including: means for identifying a core concept and other sentence elements in the natural language document sample; means for determining a relation between a current concept of each sentence element and the core concept; means for searching in the concept library for a qualifier concept, a relation between the qualifier concept and the core concept being identical to the relation between the current concept and the core concept; means for generating a semantic item of the template based on the searching result; and means for generating a candidate value of the semantic item based on the qualifier concept having the identical relation in the case that the qualifier concept having the identical relation exists.

Another aspect of the present invention provides a method for generating a template used by the above mentioned document processing method or device from a natural language document sample, including: displaying the natural language document sample; selecting interested sentence elements in the natural language document sample as a core concept and other semantic items of the template; determining a relation between a current concept of the semantic item and the core concept; searching in the concept library for a qualifier concept, a relation between the qualifier concept and the core concept being identical to the relation between the current concept and the core concept; and generating a candidate value of the semantic item based on the qualifier concept having the identical relation in the case that the qualifier concept having the identical relation exists.

Another aspect of the present invention provides a device for generating a template from a natural language document sample, including: means for displaying the natural language document sample; means for selecting interested sentence elements in the natural language document sample as a core concept and other semantic items of the template; means for determining a relation between a current concept of the semantic item and the core concept; means for searching in the concept library for a qualifier concept, a relation between the qualifier concept and the core concept being identical to the relation between the current concept and the core concept; and means for generating a candidate value of the semantic item based on the qualifier concept having the identical relation in the case that the qualifier concept having the identical relation exists.

Another aspect of the present invention provides a method for generating a concept library used by the above mentioned methods or devices, including: determining a core concept and a qualifier concept based on a natural language document sample; determining a relation between the qualifier concept and the core concept; and storing in association the core concept, the qualifier concept and the relation between the qualifier concept and the core concept as well as corresponding semantic codes.

Another aspect of the present invention provides a device for generating a concept library, including: means for determining a core concept and a qualifier concept based on a natural language document sample; means for determining a relation between the qualifier concept and the core concept; and means for storing in association the core concept, the qualifier concept and the relation between the qualifier concept and the core concept as well as corresponding semantic codes.

Another aspect of the present invention provides a non-transitory computer readable article of manufacture tangibly embodying computer readable instructions which when executed causes a computer to carry out a document processing method, including the steps of acquiring a template having at least one semantic item, where candidate values of the semantic item and relations among semantic items are associated with machine-processable semantic codes and the template is associated with a corresponding natural language expression mode; receiving an input value for the semantic item of the template; generating a machine-processable document including the machine-processable semantic codes based on the input value, the relation among the semantic items, and the machine-processable semantic codes as associated; and generating a natural language document including the input value based on the input value and the natural language expression mode.

According to the above mentioned embodiments, edition of the natural language document and generation of the corresponding machine-processable document with accurate semantics can be both achieved, thus providing a possibility for semantic interaction of document in different systems and increasing efficiency. According to the above mentioned embodiments, a template and a concept library can be provided to support the edition and generation.

BRIEF DESCRIPTION OF THE DRAWINGS

The above and other objects, features and advantages of the present invention will be more readily understood with reference to the following description of the embodiments of the present invention taken in conjunction with drawings. In the drawings, same or corresponding technical features or means are denoted by same or corresponding reference signs. The drawings together with the following detailed description are incorporated in and constitute a part of the specification, and are used for further exemplifying preferred embodiments of the present invention and explaining the principles and advantages of the present invention. In the drawings:

FIG. 5 is a schematic diagram of a document example obtained by a document processing method.

DETAILED DESCRIPTION OF THE PREFERRED EMBODIMENTS

Figure 1:
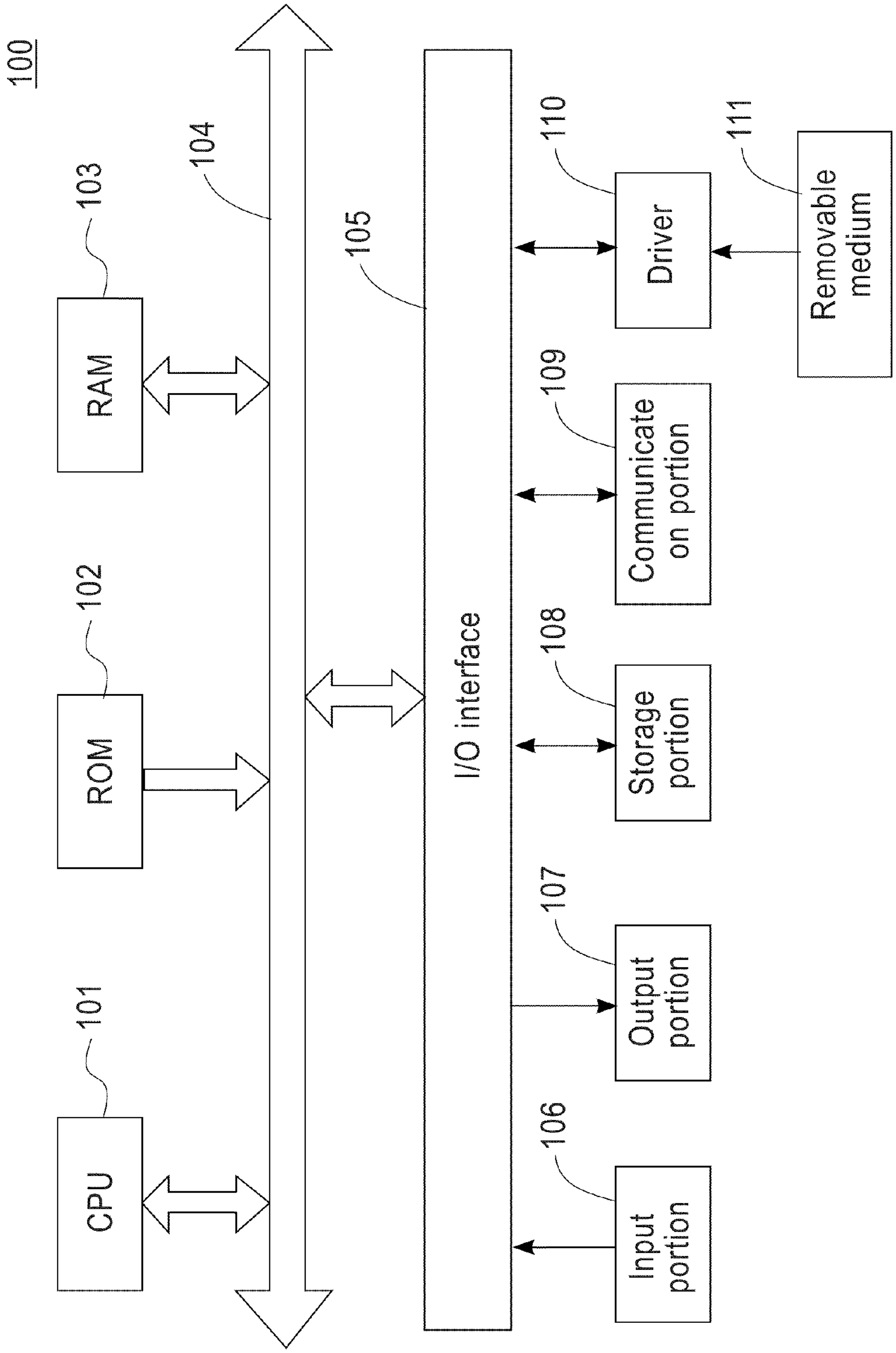
FIG. 1 is a schematic diagram of an example of an information processing apparatus for implementing embodiments of the present invention.

Exemplary embodiments of the present invention will be described below in conjunction with the drawings. For clarity and simplicity, some features of practical embodiments are not described in the specification. However, it should be understood that many decisions specific to embodiments must be made in the course of developing any of this kind of practical embodiments, so as to achieve a specific object of a developer, such as meeting limiting conditions related with a system and a service, the limiting conditions possibly varying along with the difference between the embodiments. In addition, it should be further understood that, although a developing work can be very complicated and time-consuming, this kind of developing work is only a routine task for those skilled in the art benefiting from the present disclosure.

It should be further pointed out that, in order to avoid obscuring the present invention due to unnecessary details, only device structures and/or processing steps closely related to the schemes according to the present invention are shown in the drawings while omitting other details having little relation with the present invention.

First, referring to FIG. 1, FIG. 1 shows a schematic diagram of an example of an information processing apparatus 100 for implementing embodiments of the present invention.

In FIG. 1, a CPU 101 executes various processing according to programs stored in an ROM 102 or programs loaded from a storing portion 108 to an RAM 103. In the RAM 103, data required when the CPU 101 is executing various processing are also stored as required.

The CPU 101, the ROM 102 and the RAM 103 are connected with each other via a bus 104. An I/O interface 105 is also connected to the bus 104.

The following components are connected to the I/O interface 105: an input portion 106, including for example a keyboard and a mouse; an output portion 107, including for example a display such as a CRT display and an LCD and a speaker; a storage portion 108, including for example a hard disk; and a communication portion 109, including for example a network interface card such as an LAN card and a modem. The communication portion 109 executes communication processing via a network such as the Internet.

As required, a driver 110 is also connected to the I/O interface 105. A removable medium 111 such as a magnetic disc, an optical disk, a magneto optical disk, and a semiconductor memory is installed on the driver 110 as necessary, so that the computer programs read from there are loaded in the storage portion 108 as necessary.

Programs can be loaded into a computing apparatus from a network such as the Internet or a storage medium such as a removable medium 111.

It will be understood by those skilled in the art that this kind of storage medium is not limited to the removable medium 111 which stores programs and is distributed separately from the apparatus to provide programs to a user. Examples of the removable medium 111 include a magnetic disc (including an FD, registered trademark), an optical disk (including a CD-ROM and a digital DVD), a magneto optical disk (including an MD, registered trademark) and a semiconductor memory. Alternatively, the storage medium can be the ROM 102, a hard disk contained in the storage portion 108 or the like and has programs stored therein, and is distributed to a user together with an apparatus containing them.

According to one aspect of the present invention, in order to avoid a user from directly processing machine-processable semantic codes, it is proposed that the generation of machine-processable document is implemented by using a template, thus implementing a mediation between the machine-processable semantic codes and the user with the template. It, on one hand, is avoided that the user directly processes (such as inputs) various semantic codes which is difficult for the user to remember and grasp, and thus, the user only needs to input using the natural language. On the other hand, an interrelation among semantic codes in the final document can be constructed by using an interrelation among concepts contained in the template, thus releasing the user from a cumbersome editing work of semantic codes. In order to generate the natural language document, it is further proposed to associate the template with a specific natural language expression mode, thus being able to obtain the natural language document after the user inputs a corresponding value to each semantic item of the template.

Figure 2:
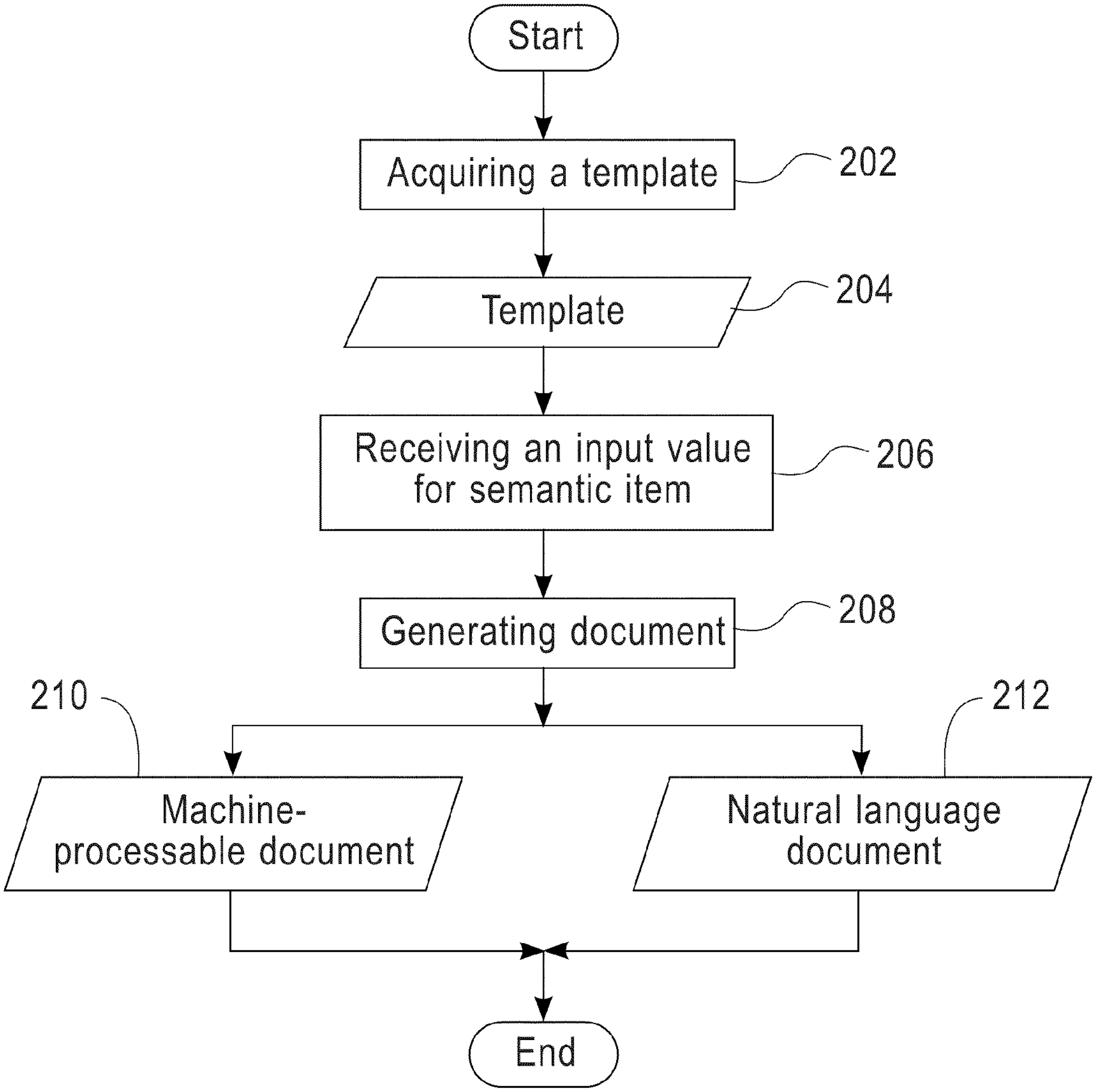
FIG. 2 is a flowchart of a document processing method.

FIG. 2 shows a flowchart of an embodiment of a document processing method according to the present invention. As shown in FIG. 2, the document processing method according to the embodiment includes: acquiring a template 204 having at least one semantic item (step 202), where candidate values of the semantic items and relations among the semantic items are associated with machine-processable semantic codes, and the template is associated with a corresponding natural language expression mode; receiving an input value for the at least one semantic item of the template (step 206); generating a machine-processable document 210 including the machine-processable semantic codes based on the input value, the relations among the semantic items, and the associated machine-processable semantic codes; and generating a natural language document 212 including the input value based on the input value and the natural language expression mode (step 208).

Figure 3:
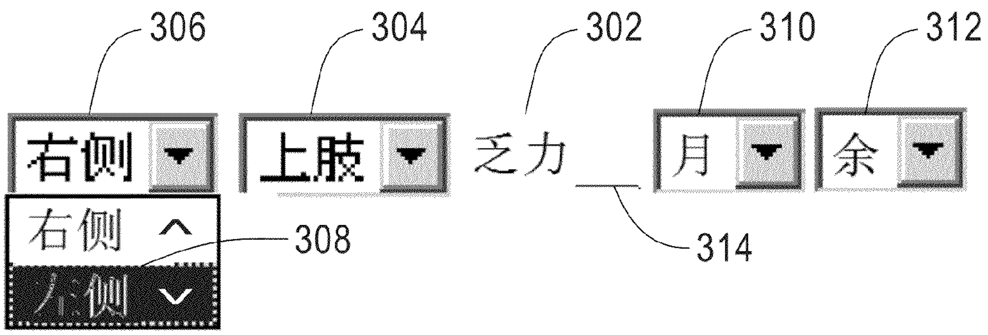
FIG. 3 is a schematic diagram of an example of a document template.

As mentioned above, the candidate values of the semantic items of the template 204 as well as the relation among the semantic items are related to the machine-processable semantic codes, where the semantic items and the candidate values indicate concepts related to content expression of the document instead of only indicating a text itself which is not related to content expression of the document and is only related to language expression. As shown in FIG. 3, "right side (右侧)", "upper limb (上肢)", "lack of strength (上肢)", "four (四)", "month (月)", "over (余)" are the values of the following semantic items of the template "feeble (乏力)": clinical finding 302 (the value of which is "lack of strength (乏力)"), laterality of clinical finding 306 (the value of which is "right side (右侧)"), finding site of clinical finding 304 (the value of which is "upper limb (上肢)"), time length of clinical finding 314 (the value of which is "four (四)"), time unit 310 (the value of which is "month (月)") and an additional description to the time 312 (the value of which is "over (余)"). If a single word such as "side" and "strength" is observed, then the single word can not generate the semantic relation with the content of the template (document in turn) and is only a word in the sense of language, which can be distinguished by a person or a computer. As can be seen, it is not excluded that the candidate values of some semantic items is a single character (or word), such as "month" and "over". From the point of view of language, it is possible that semantic items are most composed of more than one character or word in Chinese or the like while most semantic items are composed of words in English and the like.

The above mentioned semantic items have specific interrelations between them. For example, the laterality of clinical finding and the finding site of clinical finding mentioned above in the previous paragraph both define clinical finding. The above mentioned semantic items and the interrelations among the semantic items are related to the respective machine-processable semantic codes in the template. For example, the semantic item "clinical finding" 302 in the template shown in FIG. 3 is a constant term, i.e., "lack of strength" (of course, it can also be set differently from FIG. 3, for example, the "clinical finding" 302 can be selected from a plurality of candidate values such as "lack of strength" and "edema"), and based on a qualifier relation between the semantic items "finding site" 304 and "clinical finding" 302, it can be known that the practical concept corresponding to the "clinical finding" is "weakness of limb". Therefore, the template stores a semantic code "300224836" corresponding to "weakness of limb" therein (as shown in FIG. 5). As another example, for the value "upper limb" of the semantic item "finding site" 304, the template stores a semantic code 30024216 (finding site) representing the qualifier concept between the item and the "weakness" and a semantic code of a candidate value such as "300294325" (upper limb), respectively.

The above is only to describe the interrelation among semantic codes stored in the template and semantic items as well as the candidate values by means of FIG. 5, and its specific storage way can be diversified. What is shown in FIG. 5 is in fact an XML document obtained by merging a natural language document example obtained according to the embodiment of the present invention (<text> "the upper limb on the right side has been weak for over four months, the chest on the left side has an ache accompanied by palpitation for three days, and there exists a pyopericardium") (<text> "右侧上肢乏力四月余，左侧胸部疼痛三天伴心悸，心包积脓") with a part of the corresponding machine-processable document (<entry>).

In addition, as mentioned above, the template 204 is related to a corresponding natural language expression mode. What is shown in FIG. 3 is a kind of relatively intuitional express mode, i.e., the template itself is embodied as a natural language document style. For example, when the semantic items take the values shown in FIG. 3, the obtained natural language document is what is apparently shown in FIG. 3: "the upper limb on the right side has been weak for over four months" ("右侧上肢乏力四月 余"). According to different values of the semantic items, the document can for example change into "the lower limbs on the two sides have been weak for three months" ("双侧下肢乏力三月整"). The relation between the template 204 and the natural language document pattern is not necessarily the form shown in FIG. 3. For example, the specific natural language pattern can only exist in the definition of a template, while the natural language pattern can not be seen in a displayed template. For example, a template can be embodied as a table.

Again, "document" shall be understood broadly, i.e., it indicates any form of semantic expression. It can be a complete document and can also be some part of a bigger document irrespective of the size. For example, as shown in FIG. 5, both of the natural language document obtained according to the embodiment of the present invention and the machine-processable document are parts of the XML document, and the natural language document part of the XML document is displayed or printed to a related user (for example a doctor, a nurse, a patient.). For example, while the machine-processable document part of the XML document is not displayed to the user but is only stored in a machine for data exchange. A document can be composed of a single part and can also be composed of a plurality of parts. For example, a document includes various chapters and entries, or a chapter further includes various entries. Under these cases, a whole document, one or more chapters, one or more entries, and a segment of a document, a chapter and an entry can all be regarded as a document under the context of the present invention. For example, the natural language document shown in FIG. 5 can be considered as including three entries: "the upper limb on the right side has been weak for over four months" ("右侧上肢乏力四月余"), "the chest on the left side has an ache accompanied by palpitation for three days" ("左侧胸部疼痛三天伴心悸"), and "there exists a pyopericardium" ("心包积脓"), and any one or any combination of the three entries can be regarded as "a natural language document" under the context of the present invention. The corresponding machine-processable document part also works similarly. For example, the machine-processable document part shown in FIG. 5 is in fact the first entry corresponding to the above mentioned natural language document. In the context of the present invention, it can be considered that a template corresponds to a document or a part of a document (for example, "entry" or "chapter"). From the point of view of a template, what FIG. 3 shows is only one of the simplest template examples, and it can be considered that it corresponds to the entry. Based on a similar principle, a more complicated template can be structured. For example, a template corresponding to a chapter or even a template of a whole document can be structured.

For the "machine-processable semantic code" and the "machine-processable document 210", as described in the part of "background art", they do not indicate processing for a code and a document at a text level in the sense of traditional text processing, but indicate a code at a semantic level and a processing for a document at a semantic level. This point has also been reflected in the discussion for "a semantic item" and its candidate value in the above.

Figure 10:
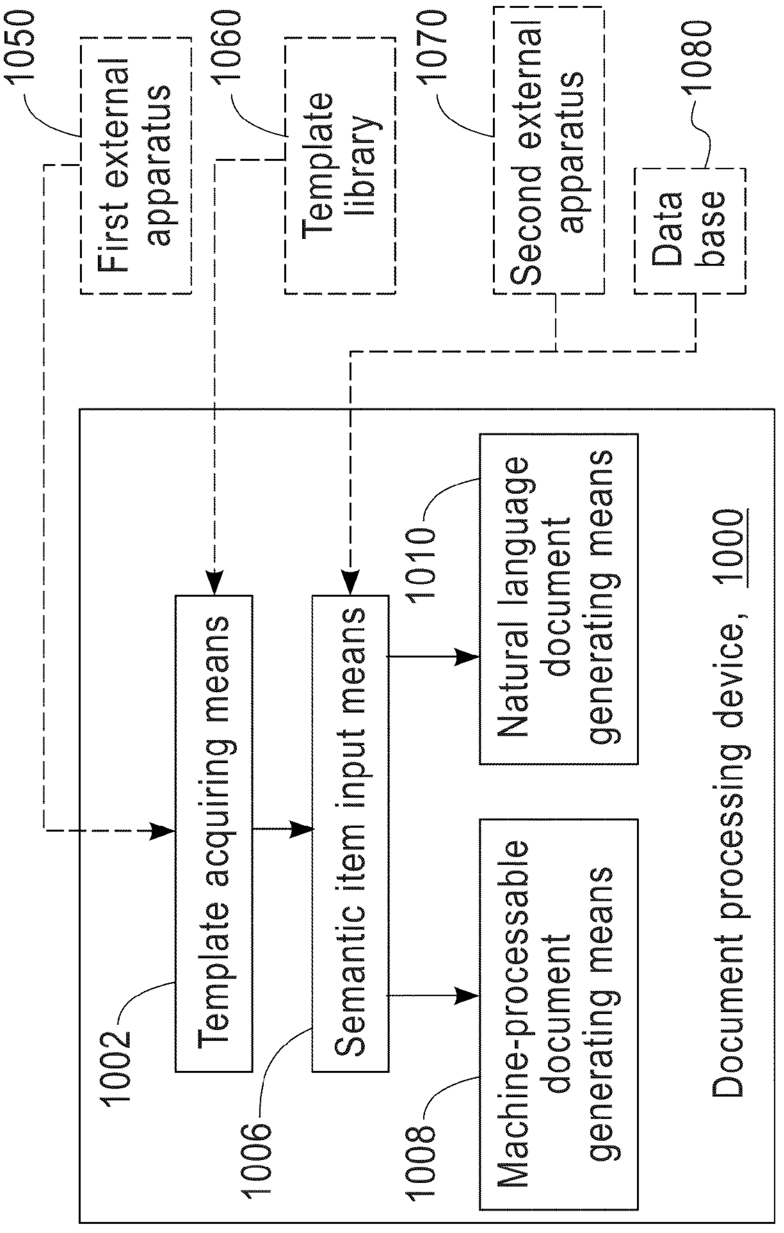
FIG. 10 is a flowchart of a document processing device.

The template 204 can be acquired from an external apparatus (such as a first external apparatus 1050 shown in FIG. 10). For example, the template 204 can be prepared specially by a service provider for the use of an end user, so the user can acquire the template 204 directly from a server, for example, of a service provider. Alternatively, the external apparatus can be a template library 1060 (see FIG. 10). The template library 1060 can be prepared in advance by the user or be purchased from the service provider, and the template library 1060 can be offline or online.

The template 204 can also be structured by the user himself. For example, according to the users own language express mode and a machine processing requirement, the user can directly design a template shown in FIG. 3, for example, including candidate values of semantic items and semantic codes. Alternatively, with reference to an existing language expression mode, the user can design a template. For example, a sample of a natural language document of a document type to be processed is extracted, a specific sentence element in the expression mode is set as a semantic item of a template according to the characteristics of the document type, candidate values of the semantic item are set, and respective semantic codes are set according to the machine processing requirement.

The above method for structuring the template 204 is relatively free, but the user needs to devote many efforts. In view of this, the present invention further proposes a method for structuring a template. Refer to the description of other embodiments below for details.

Following step 202 of acquiring the template is step 206 of receiving the input values of at least one semantic item of the template. The input value can come from a manual input or come from another input source of an external apparatus. When it is input manually, operations can be done on a displayed interface. As shown in FIG. 3, for some semantic items such as "time length" 314, the input value needs to be inputted directly. For some semantic items such as "laterality" 306, the template can be designed as a menu input mode, for example a pull-down menu 308 shown in the figure, or be designed as being input directly. When the template is designed as the menu input mode, it is not necessary to use the pull-down menu 308 shown in the figure, and an exclusive choice list or another possible form can also be used.

When the input value comes from another input source of an external apparatus, the interface can not be displayed or be displayed so as to be monitored by a person. For example, when the template content involves the detection result of a detection apparatus, a detection apparatus (a second external apparatus 1070, FIG. 10) connected to a computing apparatus used by the embodiment of the present invention can input the detection result directly into the computing apparatus. For example, the information of "normal cardiac rhythm" can be input directly into a corresponding template by an electrocardiogram apparatus which can make a decision autonomously. Alternatively, the input information can come from a remote apparatus, such as another detection apparatus which is not at the same place as that of the computing apparatus implementing the embodiment of the present invention, a diagnosis apparatus or a computing apparatus, via a network. For example, for an application in a hospital, the input information can come from an automatic detecting apparatus (for example an electrocardiogram apparatus or a blood pressure measuring apparatus.) or a computing apparatus from another department (for example the input by a doctor or a nurse from another department on corresponding computing apparatus).

The input source of the external apparatus can also be a local or network database 1080 (FIG. 10). For example, for hospitalized patients or return visit patients, when editing a document (such as "a discharge summary") by using the embodiment of the present invention, the hospital already possesses a lot of data and these data can be invoked by the embodiment of the present invention, thus accomplishing the above step 206 of inputting values for semantic items.

Step 208 is generating a document. Generally speaking, the external form (appearance), the internal form (storage form in the machine) and the final document form of the template are consistent. For example, it can be considered that the external form of the template is as shown in FIG. 3 and the internal form is similar to what is shown in FIG. 5 (only except that values and corresponding codes involved in FIG. 5 are set to be replaceable or optional). Therefore, step 208 of generating a document is only to replace the corresponding content in the contents shown in FIG. 5, for example, according to the input in FIG. 3.

However, whether the natural document aspect or the machine-processable document aspect, the form of the final document can also be different from the form of the template. For example, the appearance of the template can be different from the table form of FIG. 3, so as to facilitate the input person (particularly when the template is relatively complicated); and the storage format of the machine can be different from what is shown in FIG. 5, for example for the purpose of saving storage space. In this case, for the natural language document, a natural language document needs to be generated according to the natural language expression pattern associated with the template (i.e., the pattern shown in FIG. 3) and the input values of the semantic items; and for the machine-processable document, it is required that a wrapper program such as an XML Wrapper generates a machine-processable document such as an XML document based on the input values, the relation between various semantic items of the template, and the machine-processable semantic codes associated with the values and the relation.

The format of the natural language document can be any format and the machine-processable document can have any other format instead of being limited to the XML document. Moreover, as mentioned above, the natural language document and the machine-processable document can be separate documents or one document incorporating them together, such as an XML document incorporating them together as shown in FIG. 5.

In an embodiment, when an input value of semantic item is manually inputted, an input interface of the semantic item needs to be displayed and the input value is received via the input interface. The input interface can also display an input from an external apparatus so as to be monitored by a user (in this case, it can be considered that the input of the external apparatus is also received via the input interface).

The interface includes two aspects: display format and display content.

The display format can be configured in the template so that an end user program can determine the display format based on the basic content of the template (i.e., what semantic items the template contains) and the characteristic of the computing apparatus (such as the characteristic of its display). Alternatively, the template can also configure the display format by itself while the end user makes adjustment according to the characteristic of the computing apparatus. The end user can even adjust the display format and display style of the template according to the users own preference.

In the aspect of the display content, for some template, the semantic items are definite. Candidate values of each semantic item can be contained in the template and can also not be contained in the template. When the candidate values of some semantic item have been contained in the template, the end user program can directly display these candidate values as, for example, a menu or a list, and the user performs inputting by selection. When the candidate values of some semantic item are not contained in the template, the end user program can display the semantic item as a display item, and the user directly inputs the display item without selection. Even for the case of providing the menu or list, the interface can also be provided for direct input instead of selection.

In addition, if there is a concept library 1180 containing the concepts to be used by a document and/or the interrelation among the concepts (FIG. 11), the end user program can further generate the candidate value list (menu) of semantic items in real time, or update the candidate value list contained in the template in real time based on the concepts and interrelation among the concepts in the concept library.

Figure 4:
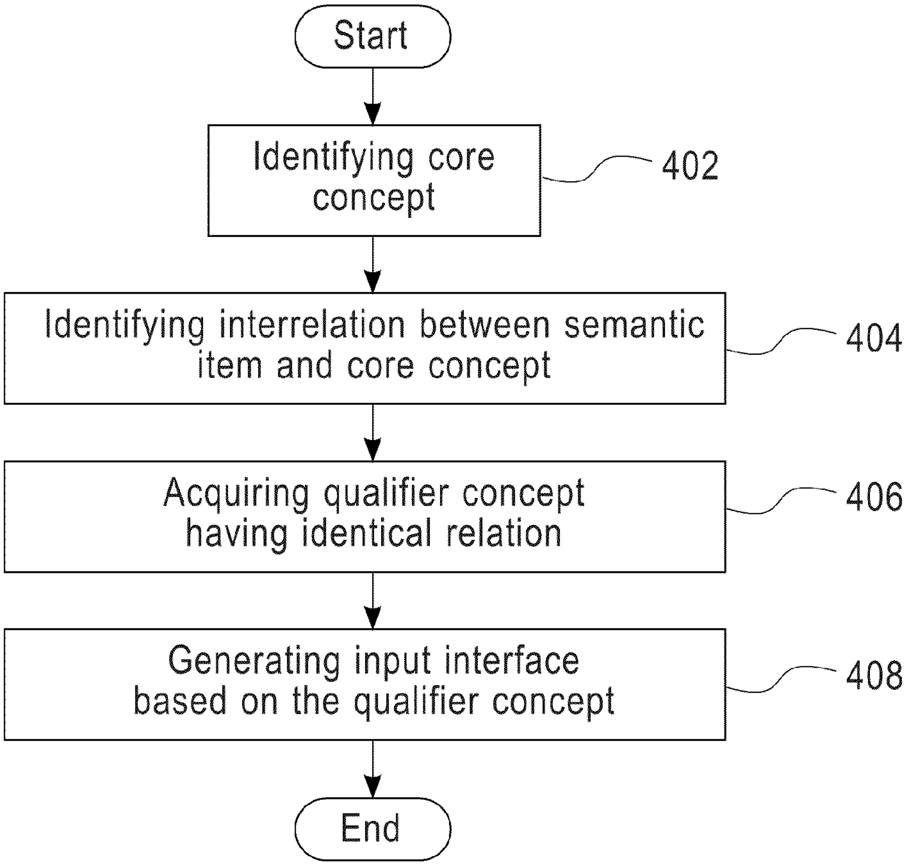
FIG. 4 is a flowchart of a method for providing an input interface of a template item candidate value in the document processing method.

Specifically, in a variant, as shown in FIG. 4, the input interface displaying at least one semantic item can include: identifying a core concept in the template (step 402); identifying an interrelation between the at least one semantic item and the core concept (step 404); acquiring a qualifier concept from the concept library, where an interrelation between the qualifier concept and the core concept is identical to the interrelation between the semantic item and the core concept (step 406); and generating the input interface based on the qualifier concept (step 408) for inputting the value of the semantic item.

A concept can correspond to a semantic item but does not necessarily correspond to the semantic item, and is not necessarily completely consistent with the expression form of the semantic item in the template. For example, as mentioned above, in the template shown in the FIG. 3, if the "upper limb weak ("上肢乏力")" is not concise, then since there is a definition of "finding site" in the semantic item "clinical finding", the expression of "clinical finding" in the template is only the word "weak", whose corresponding concept in the concept library is in fact "weak limb".

For the present embodiment, the above mentioned concept library 1180 is an existing library, and can be used directly by the method of the embodiment. The concept can be created by the user in advance, and can also be provided by a third party such as a service provider. The concept library 1180 can be a local library and can also be located on a remote server.

When the concept library 1180 is created by the user in advance, although any suitable method can be used, the present invention proposes a method, which will be described in detail in the embodiment below. In this embodiment, the constitution of the concept library 1180 will be described first.

Figure 15:
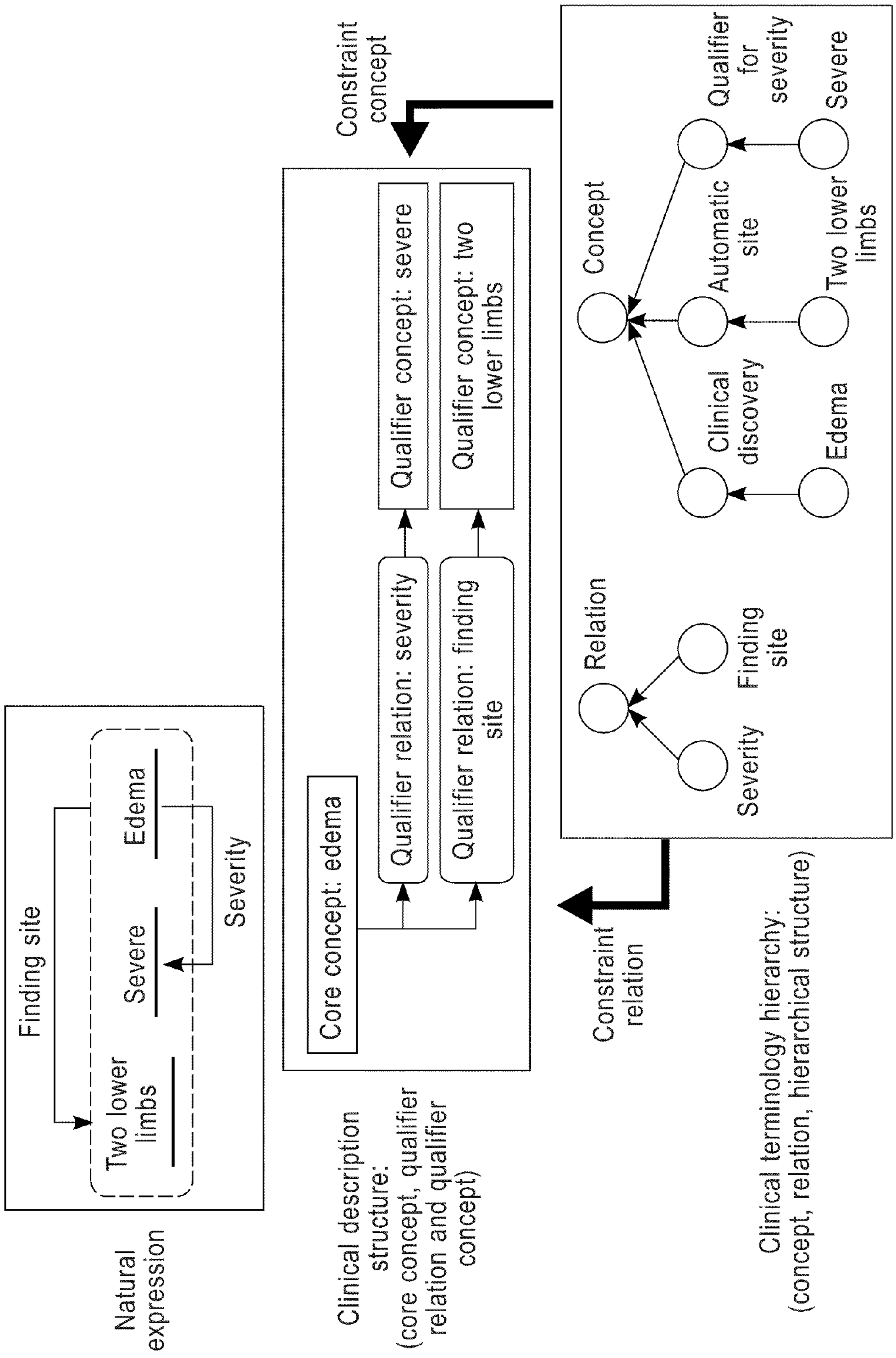
FIG. 15 is a schematic diagram of an interrelation among a concept library, a semantic structure and a natural expression.

The concept library 1180 includes various (or at least part of) concepts (the concepts at a semantic level instead of, for example, texts and words at a text processing level) that can be used in a document, at least a part of possible attributes of at least a part of the concepts and an interrelation among at least a part of the concepts. FIG. 15 shows an example from a natural expression to a natural expression semantic structure and then to a concept library. In the example, a clinical description and a clinical terminology hierarchy are taken as an example. The clinical terminology hierarchy (i.e., the concept library) includes "concept" and "relation" organized according to a hierarchical structure. The "concept" includes, for example, clinical finding, anatomic site, qualifier for severity. The clinical finding includes edema, for example, pruritus (not shown), weak (not shown). The anatomic site includes various sites of a human body, such as two lower limbs and two upper limbs (not shown). The "relation" includes, for example, severity and finding site.

The example of the clinical description semantic structure shown in FIG. 15 is obtained based on analysis for a natural description ("sever edema in two lower limbs") and the definitions of the clinical terminology hierarchy (i.e., the concept library) for the relation and the concept. Specifically, the core concept is "edema", "severe" and "edema" have a qualifier relation therebetween, and the attribute of the relation is "severity", while "two lower limbs" and "edema" have a qualifier relation therebetween, and the attribute of the relation is "finding site". As a further variant for the concept library, the concept library can also includes at least a part of the association relation therein, i.e., a common semantic structure relation between concepts in a natural expression in a general case.

As a further variant for the concept library, the concept library can further include semantic codes of a concept (including the attribute of the relation), i.e., the "machine-processable semantic codes" described in the first embodiment. At this time, a template can not store a semantic item (and possible candidate values) and semantic codes of its interrelation, and instead, when generating a machine-processable document, the concept library 1180 is searched to obtain corresponding semantic codes. Of course, irrespective of whether there are corresponding semantic codes in the concept library 1180, the template can store the semantic codes.

Referring back to the display flow of the input interface: in step 402 of identifying a core concept in a template, the core concept is a central word expressed by the template. For example, in a diagnosis opinion for a patient, clinical finding is a core concept. The template can mark some semantic items as core concepts. The step 402 of identifying a core concept in a template is a step of acquiring the information from the template. The template can not contain the information and the concept library 1180 can be searched for finding the core concept in the template. Alternatively, the core concept can be specified by the user. For example, in FIG. 3, the "weak" site can also be optional as other semantic items. For example, "edema" and "pruritus" can be selected at a same site. As an example, it can be configured that when the user first selects a candidate value for some semantic item, the candidate value becomes the core concept of the template. For example, "upper limb" can also be selected as the core concept and different values such as "weak", "edema" and "pruritus" can be selected for the semantic item "clinical finding".

In the next step 404, for a semantic item to form an input interface, an interrelation between the semantic item and the core concept is identified. Similar to the 402 of identifying a core concept in a template, the template can already contain the interrelation. The step 404 is a step of acquiring the information from the template. The template can also not contain the information, and therefore the concept library 1180 is searched to find an interrelation between the semantic item and the core concept.

In step 406, the concept library is searched to acquire qualifier concepts meeting the following condition from the concept library: interrelation between the qualifier concept and the core concept is identical to that between the semantic item determined in step 404 and the core concept. That is to say, the qualifier concepts can qualify the core concept as the semantic item, which means these qualifier concepts are possible options of the semantic item. The interrelations are identical and can include two levels of meanings. First, the qualifier relations of the qualifier concepts have identical attributes. For example, the attributes of the qualifier relations expressed by such two qualifier concepts as "slight" and "severe" are both "severity"; and the attributes of the qualifier relations expressed by such two qualifier concepts as "two lower limbs" and "two upper limbs" are both "finding site". This level of meaning can be taken as a minimal requirement. In addition, if the concept library further contains the semantic structure relation mentioned above, then the qualifier concepts meeting the condition should further have an identical semantic structure relation, i.e., marked in the concept library as qualifying a same core concept. For example, both "two lower limbs" and "two upper limbs" are used to qualify "edema" and "weak", but "hair" can not be used to qualify "edema" or "weak".

Based on the result of step 406, a choice interface can be generated in step 408. For the semantic items that have no corresponding concepts, an input interface is generated. The selection interface can also contain an input function i.e., can make a selection by direct input. Therefore, in the context of the present invention, the input interfaces include various interfaces that can accomplish the input object. The allowed operations of the input interfaces are not limited to direct input and can also include selection or selection plus direct input.

The template generating method mentioned above will be detailed below.

Figure 6:
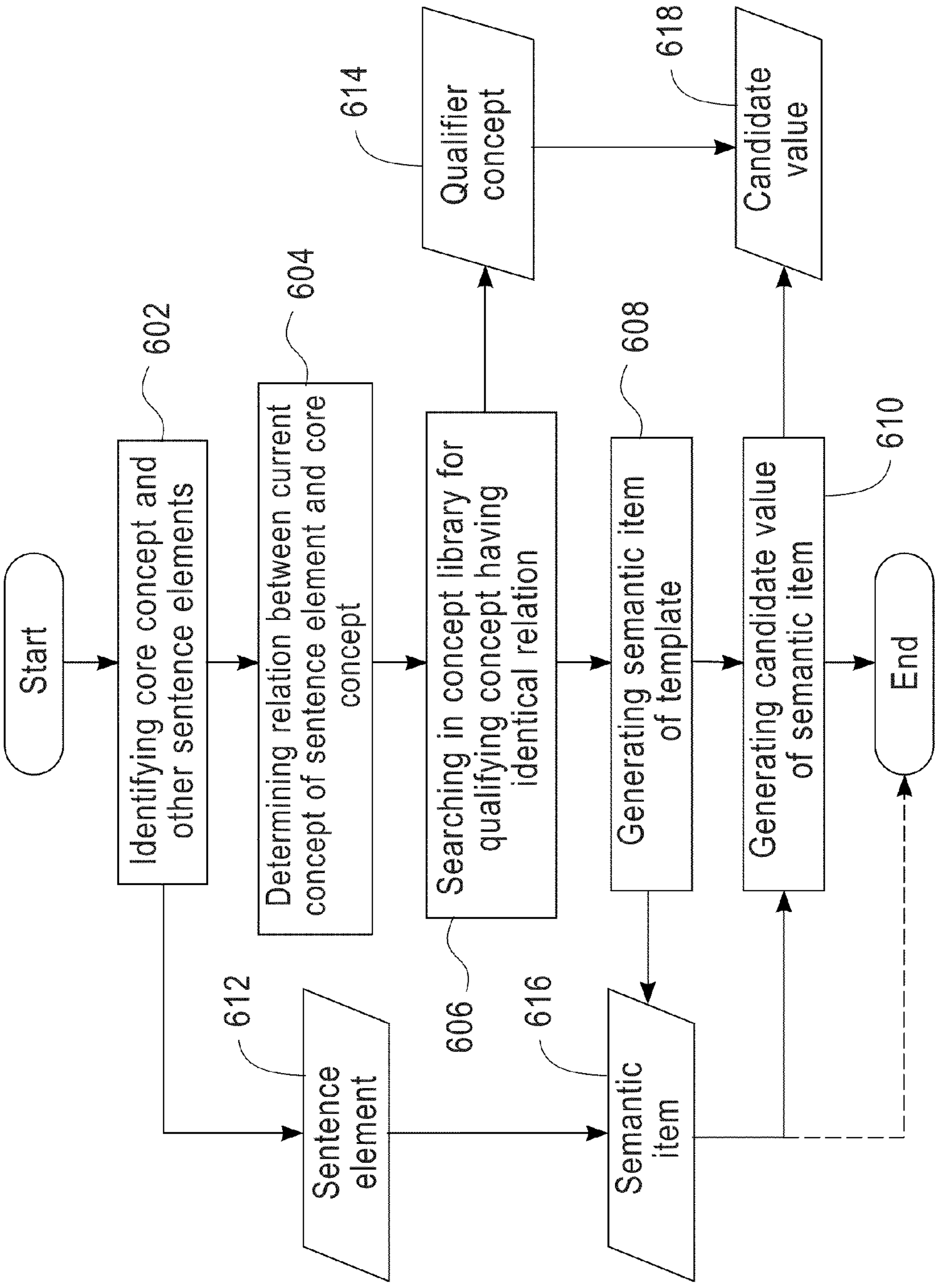
FIG. 6 is a flowchart of a template generating method.

FIG. 6 shows an embodiment of a template generating method. As shown in the figure, the method can include: identifying a core concept and other sentence elements 612 in the natural language document sample (step 602); determining a relation between a current concept of each sentence element 612 and the core concept (step 604); searching a qualifier concept 614 in the concept library, a relation between the qualifier concept 614 and the core concept being identical to the relation between the current concept and the core concept (step 606); generating a semantic item 616 of the template based on the searching result (step 608); and generating a candidate value 618 of the semantic item 616 based on a qualifier concept 614 having the identical relation in the case that there exists the qualifier concept having the identical relation (step 610).

In the above mentioned embodiment, a natural language document sample is taken as a basis for generating a template. The natural language document sample is a reference style of a natural language document to be generated based on the template. For example, with reference to a natural language document sample of "the upper limb has been weak for over four months", a template can be structured to generate a similar natural language document, such as "the lower limb has been weak for less than three months" and "the lower limb has been edema for less than a month".

The step of identifying a core concept and other sentence elements 612 in the natural language document sample (step 602) can be accomplished by using a plurality of means. First, the natural language document sample can be a preprocessed sample, in which the core concept and various other sentence elements have been marked. For example, in the sample "the upper limb has been weak for over four months", by preprocessing, there can be marked out a core concept "weak" (or for example, "upper limb") and other sentence elements of the sample: "upper limb", "Four", "month" and "over". In this case, the step is to simply extract information related to the core concept and the sentence elements from the annotation information of the document sample.

It should be noted that, in the present invention, a sentence element is not a grammar element but indicates a concept at a semantic level in a document. Since a concept can be replaced by a same kind of concept in different documents, in the present invention, a "sentence element" is used to indicate a variable with different concepts as its values (candidate values).

In the case that a natural language document sample is not preprocessed, then it is equivalent to implement the above mentioned annotation procedure in real time. Irrespective of that the preprocessing is accomplished in advance or the annotation is accomplished in real time, both of them can be accomplished manually or by using a natural language processing technique. For example, a semantic unit (i.e., concept) in a natural language document sample is identified and marked by using any suitable natural language processing technique with or without the help of a dictionary.

Alternatively, the core concept and the sentence elements (i.e., the current concept of the sentence elements) can be identified by searching a concept library.

After identifying the core concept and the sentence elements, in the next step 604, an interrelation between the current concept of each sentence element and the core concept is determined. Like the identification of the core concept and the sentence elements, the determination of the interrelation can also be implemented based on annotation for a document sample in preprocessing, real-time annotation and searching in the concept library. The annotation for a document sample in preprocessing and the real-time annotation can both be implemented manually or by using any suitable natural language processing technique.

As known by those skilled in the art, there are many natural language processing techniques that can identify semantic units and mutual qualifier relations among the semantic units in a document sample, which will not be described in detail here for clarity. For example, Generation of Level 3 CDA document using CDA Studio, Sungwon Jung, Jinwook Choi, 2007 International Conference on Convergence Information Technology can identify and extract semantic concepts and interrelation among the semantic concepts from a document. The reference document is incorporated into the present application in its entirety by reference. As another example, there is a solution of mCHAS (Managing Clinical and Health Records for Analytics and Sharing) of IBM.

At step 606, a concept library is searched to acquire qualifier concepts meeting the following condition: an interrelation between each qualifier concept and the core concept is identical to that between the current concept and the core concept which was determined in step 604. These qualifier concepts can qualify the core concept like the current concept, which means these qualifier concepts are possible alternative values of the current concept. In other words, the current concept and the qualifier concept should be candidate values of a same semantic item. The interrelations are identical and can include two levels of meanings. First, the attributes of the qualifier relations of the qualifier concepts are identical. For example, the attributes of the qualifier relations expressed by two qualifier concepts such as "slight" and "severe" are both "severity". The attributes of the qualifier relations expressed by two qualifier concepts such as "two lower limbs" and "two upper limbs" are both "finding site". This level of meaning can be taken as a minimal requirement. In addition, if the concept library further contains the semantic structure relation mentioned above, then qualifier concepts meeting the condition should further have an identical semantic structure relation, i.e., the qualifier concepts are marked as being able to qualify a same core concept in the concept library. For example, both "two lower limbs" and "two upper limbs" can be used to qualify "edema" and "weak", but "hair" can not be used to qualify "edema" and "weak".

The search result can indicate that there exists a qualifier concept having the identical relation, and can also indicate that there exists no qualifier concept having the identical relation. Based on the search result, semantic items 616 of a template can be generated by using different strategies (step 608).

The case that there exists no qualifier concept having the identical relation further includes two situations. In one situation the current concept is an invariable constant value. In this case, the sentence elements of a qualifier concept that does not have the identical relation can be replaced by a constant semantic item. In another situation the current concept is a direct input value, such as a digital value. In this case, the sentence element is replaced by a semantic item that needs a direct input value. Both the constant semantic item and the semantic item needing a direct input value belong to semantic items having no candidate value options.

In addition, in the case that there exists the qualifier concept having the identical relation, all or a part of the corresponding sentence elements can be replaced with the semantic items having candidate value options of the template. In a simple case, the sentence elements of the qualifier concept having the identical relation can be replaced automatically by the semantic items having candidate value options. However, in order to prevent unsuitable replacement, interested sentence elements can also be selected as the semantic items having candidate value options of the template (including a semantic item without a candidate value option, in this situation, it is considered that no sentence element is suitable for the semantic item having candidate value option) from the sentence elements of the qualifier concept having the identical relation. For example, all the sentence elements of the qualifier concept having the identical relation can be highlighted, so that a user can select sentence elements from there to replace sentence elements of the qualifier concept having the identical relation. For the sentence elements that are not selected, similar to the above first case, the sentence elements are the constant semantic items or the semantic item needing direct input values.

In the case that the generated semantic items are constant semantic items or the semantic item needing direct input values, it is unnecessary to prepare candidate values for semantic items (as shown by the dotted line in FIG. 6). In the case that the generated semantic item is a semantic item having a candidate value option (qualifier concept having the identical relation exists) the candidate values 618 of the semantic item can be generated based on the qualifier concept (which can include current concept) having the identical relation (step 610).

Figure 7:
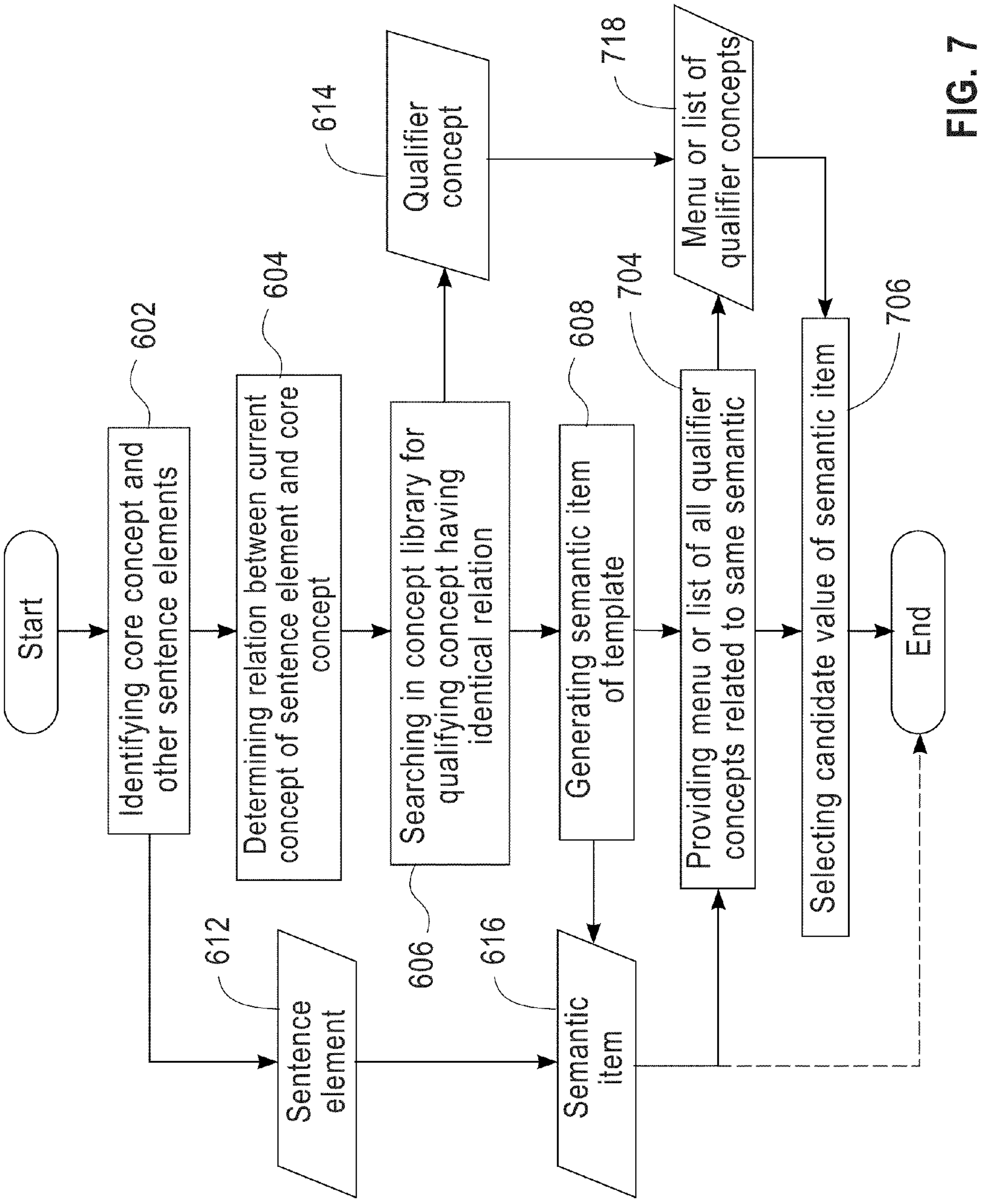
FIG. 7 is a flowchart of a template generating method according to another embodiment.

Obviously, all the qualifier concepts (which can include the current concept) having the identical relation can be generated as the candidate values 618 of the semantic item. Or, only an interested part of the concepts in the qualifier concepts (which can include the current concept) can be regarded as the candidate values of the semantic item (including the case that no candidate value is set, for example when it is considered that no concept is suitable). This is because, similarly, in the searched qualifier concepts related to a same semantic item, it is not ensured that each qualifier concept is suitable for the template to be created. Therefore, in a variant of the present embodiment, as shown in FIG. 7, step 610 in FIG. 6 is replaced with step 704 and step 706, that is, providing the menu or list of all qualifier concepts (which can include the current concept) related to a same semantic (step 704), and user selecting suitable qualifier concepts as the candidate value options of the semantic item of the template (step 706).

In the above embodiment and variants, the related steps can be repeated for other sentence elements or semantic items.

Figure 8:
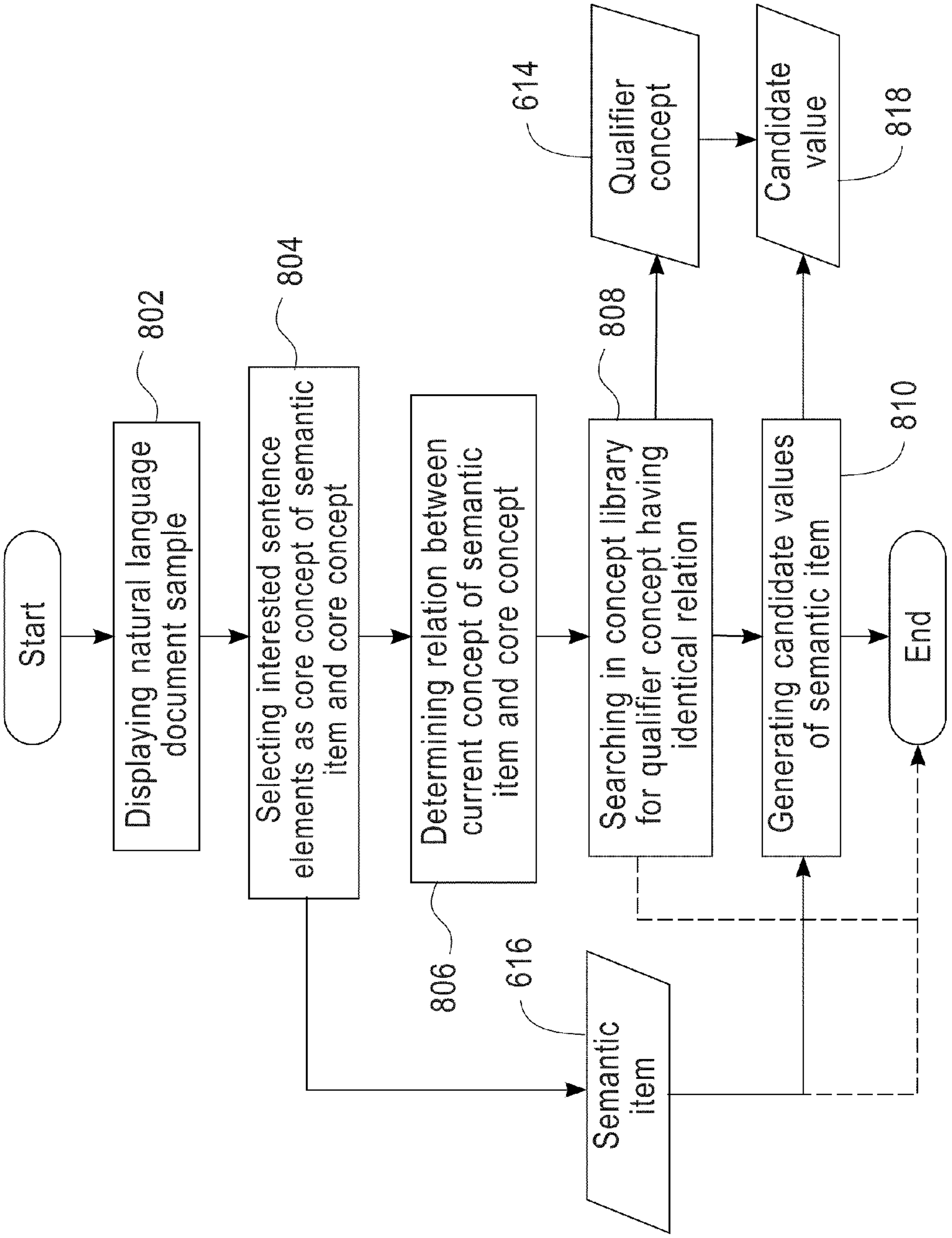
FIG. 8 is a flowchart of a template generating method according to still another embodiment.

In the above embodiment, the semantic item is generated after searching the qualifier concept having the identical relation. However, in another variant, the semantic item can be determined in advance. As shown in FIG. 8, the method for generating a template in this case includes: displaying the natural language document sample (step 802); selecting interested sentence elements in the natural language document sample as the core concept and other semantic items 616 of the template (step 804); determining a relation between the current concept of the semantic item and the core concept (step 806); searching the concept library for a qualifier concept 614, where a relation between the qualifier concept and the core concept is identical to the relation between the current concept and the core concept (step 808); and in the case that the qualifier concept having the identical relation exists, generating the candidate values of the semantic item based on the qualifier concept having the identical relation (step 810).

According to the embodiment, based on a displayed natural language document sample, the user can directly select sentence elements as the core concept and other semantic items. If the user's selection is unsuitable from the point of view of the subsequent operations, the user can make a selection again. Based on the selection, in step 806, an interrelation between the current concept of each sentence element and the core concept is determined. As described with respect to step 604, the determination of the interrelation can be based on annotation for a document sample in preprocessing, real-time annotation and searching in the concept library. The annotation for a document sample in preprocessing and real-time annotation can both be implemented manually or by using any suitable natural language processing technique, which will not be repeated here.

In step 808, the concept library is searched to acquire qualifier concepts meeting the following condition: an interrelation between the qualifier concept and the core concept is identical to that between the current concept and the core concept determined in step 806. The detailed description can refer to the above description of step 606.

The search result can be that the qualifier concept having the identical relation exists and can also be that no qualifier concept having the identical relation exists. In the case no qualifier concept having the identical relation exists, it means the current concept is an invariable constant value or a direct input value, and corresponding semantic items are then directly set as constant items or semantic items input directly without any further operations, as shown by dotted arrows in FIG. 8.

In addition, in the case that the qualifier concept having the identical relation exists, the corresponding semantic items can be the semantic items having candidate value options. The candidate values 618 of the semantic items can further be generated based on the qualifier concept (which can include the current concept) having the identical relation (step 810).

All the qualifier concepts (which can include the current concept) having the identical relation can be generated as the candidate values 618 of the semantic item. Or, only an interested part of the concepts in the qualifier concepts (which can include the current concept) can be regarded as the candidate values of the semantic item (including the case that no candidate value is set, that is, it is considered that no concept is suitable and the semantic item is a semantic item having no candidate value option). This is because, similarly, in the searched qualifier concepts related to a same semantic item, it is not ensured that each qualifier concept is suitable for the template to be created. Therefore, in a variant of the present embodiment, as shown in FIG. 7, step 810 in FIG. 8 is replaced with step 704 and step 706 shown in FIG. 7, that is, the menu or list of all qualifier concepts (which can include the current concept) related to a same semantic item can be provided, and a user can select suitable qualifier concepts as the candidate value options of the semantic item of the template therefrom.

In the above embodiment and variants, the related steps can be repeated for other sentence elements or semantic items.

The method for generating concept library 1180 mentioned above will be described below.

Figure 9:
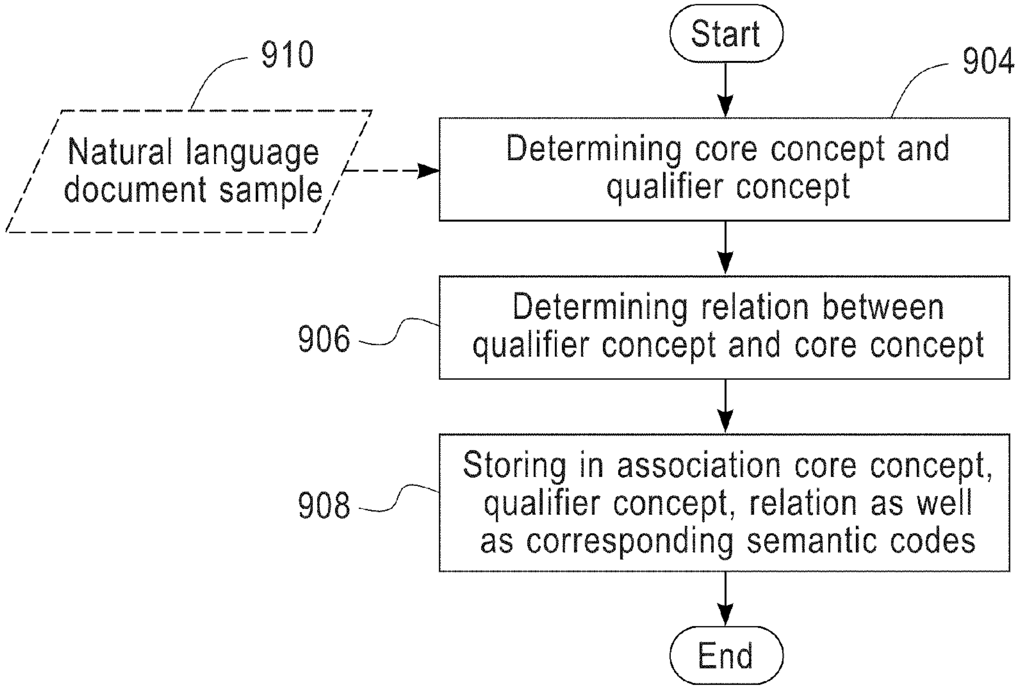
FIG. 9 is a flowchart of a concept library generating method.

As shown in FIG. 9, the method for generating concept library 1180 includes: determining a core concept and a qualifier concept based on a natural language document sample (step 904); determining a relation between the qualifier concept and the core concept (step 906); and storing in association the core concept, the qualifier concept, the relation between the qualifier concept and the core concept, and corresponding semantic codes (step 908).

Both the step 904 of determining a core concept and a qualifier concept based on a natural language document sample and the step 906 of determining a relation between the qualifier concept and the core concept can be implemented by way of annotation manually a natural language document sample 910. Or, the core concept, the qualifier concept and the relation between the qualifier concept and the core concept can also be extracted from the natural language document sample 910 by using a natural language processing technique mentioned above. The marked or extracted core concept, qualifier concept and relation are assigned to semantic code which can be processed by a computer and are stored in association.

Note that the core concept and the qualifier concept are relative with respect to each other. A concept can be a core concept in one document and can be a qualifier concept in another document. Therefore, in a concept library, a same concept can be marked as having different attributes. With the different attributes, the concept can be associated with different qualifier concepts or core concepts through the relation, respectively.

In addition, in the manual processing or the processing using a natural language processing technique, more than one natural language document samples can be used for extracting the concept and the relation. Thus, information reflected in a plurality of samples should be considered in combination. For example, as mentioned above, different attributes of a same concept can be obtained by considering a plurality of document samples in combination. In addition, for example, the possible interrelation among concepts can be stored more comprehensively by considering a plurality of document samples in combination.

[1] In a general case, one or more sequenced words can be determined as a concept, and a plurality of sequenced words can be determined as a plurality of concepts having an interrelation. For example, "anterior chest stuffy pain" is a concept composed of such two words arranged together as "anterior chest" and "stuffy pain" and belongs to clinical finding, and is assigned with a semantic code 71884009. As another example, "normal hearings on two sides" includes two concepts such as "normal hearings" and "on two sides" with a qualifier relation, the latter is clinical finding as a core concept and the former is a laterality concept as a qualifier concept. The two concepts are assigned with semantic codes 164059009 and 51440002, respectively.

In the course of manually annotating a natural language document sample or annotating a natural language document sample by using a natural language processing technique, the concepts, relations and semantic codes can be stored in a concept library while being marked, or the concept library can be generated or updated by using a batch processing mode of first annotation and then storing. In the case that a certain concept or some concepts have been marked in the natural language document sample or have been stored in the concept library, a plurality of sequenced concepts or concepts and words can generate new concepts. For example, assuming that "anterior chest" is a defined concept indicating a finding site, which has been marked or stored, the "anterior chest" will form the above mentioned clinical finding concept "anterior chest stuffy pain" (71884009) together with the word or concept "stuffy pain". In the example "normal hearings on two sides" given above, if "normal hearings" and "on two sides" have been marked or stored as concepts, then there can be known from the sample that the interrelation between the two concepts: the laterality concept "on two sides" is a qualifier concept which qualifies the clinical finding concept "normal hearings" as the core concept, and the attribute of the qualifier relation is "laterality" (semantic code 300183522, as shown in FIG. 5).

In addition, based on the concepts and relations that have been marked or stored, new concepts or new relations can be obtained through logical calculations, and the new concepts and new relations can be assigned directly with semantic codes and stored in the concept library, or can be used to mark the natural language document sample so as to be used for identifying more concepts and/or relations. For example, from known concepts "normal hearings" (164059009) and "on two sides" (51440002), it can be inferred that the qualifier concept is a finding site concept "two ears" assigned with semantic code 91159003, which qualifies a core concept i.e. a clinical finding concept "normal hearings" and is qualified by another qualifier concept i.e., the laterality concept "on two sides".

The generation of the concept library (further including a template and a template base) described in the present invention also includes updating of the concept library, and the processing of generation and the processing of updating have no substantial difference. When updating, the updating can be implemented by adding or modifying the original library or can also be additionally setting up a new library as the supplement to the original library.

The present invention further provides a document processing device 1000, a template generating device 1200, 1200' and a concept library generating device 1400. Description will be given below in conjunction with FIGS. 10-15. The devices and the methods of the above mentioned embodiments are basically consistent, so the following description is relatively concise. The detailed embodiments and operation modes of the components can refer to the descriptions of the embodiments described above.

As shown in FIG. 10, the document processing device 1000 provided by the present invention includes: template acquiring means 1002 for acquiring a template consisting of at least one semantic item, where candidate values of each semantic item and relations among the semantic items are associated with machine-processable semantic codes, and the template is associated with a corresponding natural language expression mode; semantic item input means 1006 for receiving an input value of the at least one semantic item with respect to the template; machine-processable document generating means 1008 for generating a machine-processable document including the machine-processable semantic codes based on the input value, the relations among the semantic items and the associated machine-processable semantic codes; and natural language document generating means 1010 for generating a natural language document including the input value based on the input value and the natural language expression mode.

As mentioned above, the template acquiring means 1002 can be the template generating device 1200, 1200'. The template acquiring means 1002 can also be configured to acquire an existing template or a generated template in real time from an external apparatus (for example a first external apparatus 1050 or a template library 1060). The template acquiring means 1002 can also be configured to construct a template according to a required natural language pattern. The template acquiring means 1002 can be configured to replace variable sentence elements in a natural language document sample with template semantic items to form the template.

The semantic item input means 1006 can be configured to obtain, for example, input values including existing data, data detected in real time and data input by another local or remote person or apparatus, from an external apparatus (such as a second external apparatus 1070 or a database 1080).

The semantic item input means can include means for displaying an input interface of the at least one semantic item, and means for receiving the input values through the input interface. Thus, the user can input the values of semantic items by using the interface, or monitor the input from the second external apparatus 1070 or the database 1080.

Figure 11:
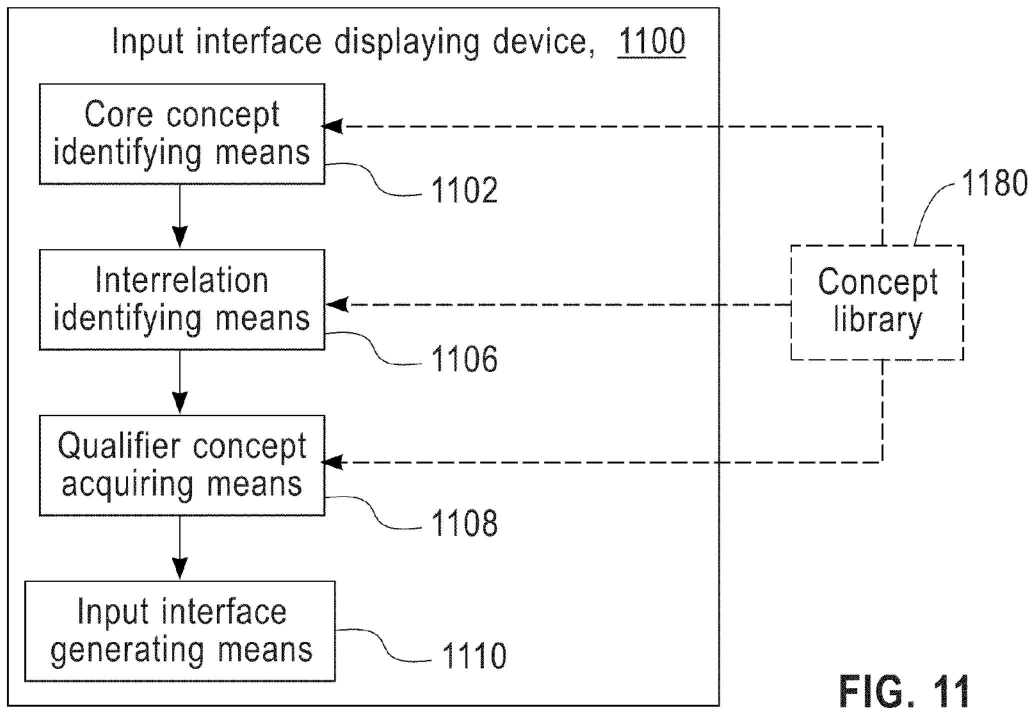
FIG. 11 is a flowchart of a device for providing an input interface of a template item candidate value in an embodiment of the document processing device.

In a variant, as shown in FIG. 11, an input interface displaying device 1100 for displaying an input interface of the at least one semantic item includes core concept identifying means 1102 for identifying a core concept in the template; interrelation identifying means 1106 for identifying an interrelation between the at least one semantic item and the core concept in the template; qualifier concept acquiring means 1108 for acquiring a qualifier concept from a concept library 1180, where an interrelation between the qualifier concept and the core concept is identical to the interrelation between the semantic item and the core concept; and input interface generating means 1110 for generating the input interface based on the qualifier concept so as to input a value of the semantic item.

The core concept identifying means 1102 and the interrelation identifying means 1106 can be configured to acquire related information (if any) from the template, acquire related information from an instruction of a user, or search the concept library 1180 for related information.

Figure 12:
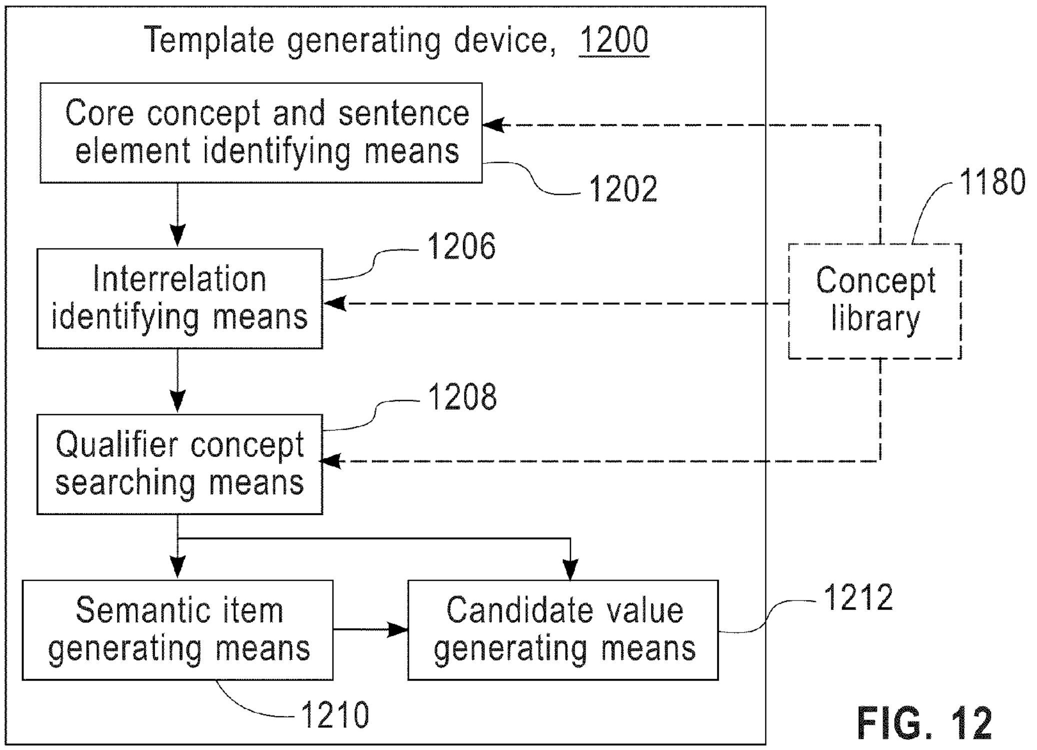
FIG. 12 is a flowchart of a template generating device.

As shown in FIG. 12, a template generating device 1200 for generating a template used by the document processing device from a natural language document sample includes: core concept and sentence element identifying means 1202 for identifying a core concept and other sentence elements in the natural language document sample; interrelation identifying means 1206 for determining a relation between a current concept of each sentence element and the core concept; qualifier concept searching means 1208 for searching the concept library 1180 for a qualifier concept, where a relation between the qualifier concept and the core concept is identical to the relation between the current concept and the core concept; semantic item generating means 1210 for generating semantic items of the template based on the searching result; and candidate value generating means 1212 for generating candidate values of the semantic item based on the qualifier concept having the identical relation in the case that the qualifier concept having the identical relation exists.

The core concept and sentence element identifying means 1202 and the interrelation identifying means 1206 can be configured to identify a core concept, sentence elements and an interrelation based on annotation for a document sample in preprocessing, real-time annotation and searching in the concept library and the annotation for the document sample in preprocessing and the real-time annotation can be implemented manually or by using any suitable natural language processing technique.

In a variant, the semantic item generating means 1210 for generating semantic items of the template based on the searching result can include means for replacing the sentence elements of all qualifier concept having the identical relation with semantic items having candidate value options of the template. In another variant, the semantic item generating means 1210 for generating semantic items of the template based on the searching result can include means for selecting interested sentence elements as the semantic items having candidate value options of the template from the sentence elements of all qualifier concept having the identical relation. In another variant, the semantic item generating means 1210 for generating semantic items of the template based on the searching result can include means for replacing other sentence elements with constant semantic items or semantic items needing direct input values. Both constant semantic items and semantic items needing direct input values belong to semantic items without candidate value option. The above variants can be combined with each other arbitrarily.

Figure 13:
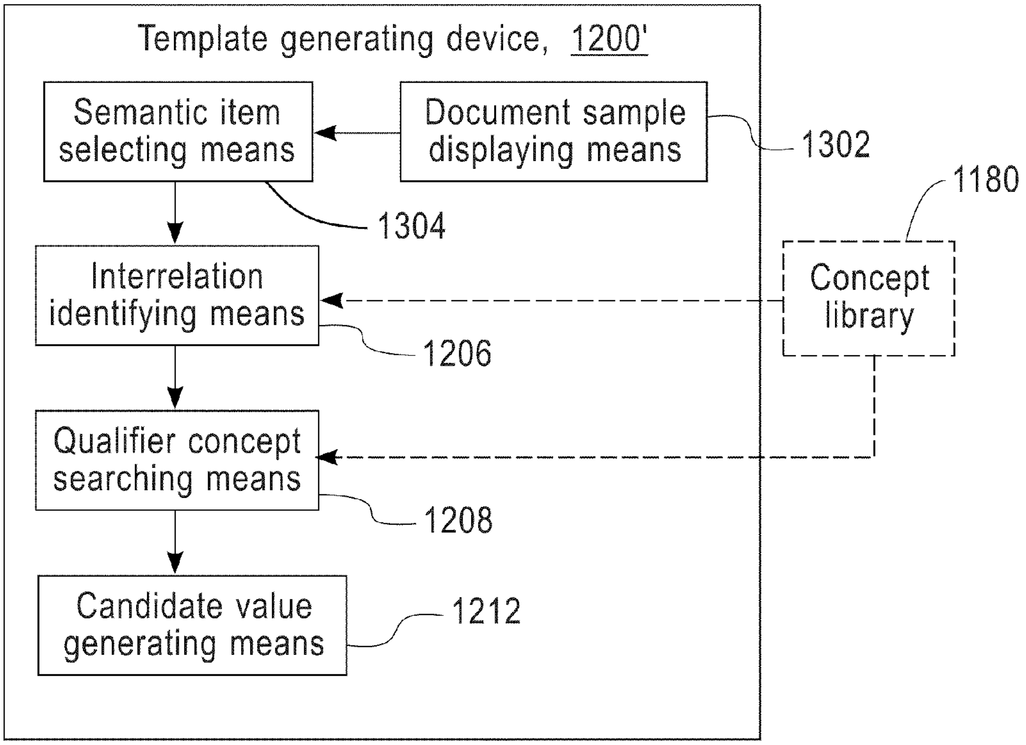
FIG. 13 is a flowchart of a template generating device according to another embodiment.

In the above embodiment, after the qualifier concept searching means 1208 searches for the qualifier concept having the identical relation, a method for generating semantic items is determined. In a variant, semantic items can be determined before searching for the qualifier concept having the identical relation. Therefore, as shown in FIG. 13, as a variant, the template generating device 1200' can include: document sample displaying means 1302 for displaying the natural language document sample; semantic item selecting means 1304 for selecting interested sentence elements in the natural language document sample as a core concept and other semantic items of the template; interrelation identifying means 1206 for determining a relation between a current concept of the sentence element and the core concept; qualifier concept searching means 1208 for searching the concept library 1180 for the qualifier concept, where the relation between the qualifier concept and the core concept is identical to the relation between the current concept and the core concept; and candidate value generating means 1212 for generating candidate values of the semantic item based on the qualifier concept having the identical relation in the case that the qualifier concept having the identical relation exists.

The interrelation identifying means 1206, the qualifier concept searching means 1208, the candidate value generating means 1212 and the concept library 1180 have been described above.

In addition, the candidate value generating means 1212 in above embodiments and variants can be configured to generate all qualifier concepts (which can contain the current concept) having the identical relation as candidate values 618 of the semantic items, or can be configured to only use an interested part of the concepts in the qualifier concepts (which can include the current concepts) as the candidate values of the semantic item (including the case that no candidate value is set: no concept is suitable and the semantic item is a semantic item having no candidate value option). In the latter situation, the candidate value generating means 1212 can include means for displaying a menu or list of all qualifier concepts and means for selecting a needed qualifier concept as the candidate value of the semantic item from the menu or list.

Figure 14:
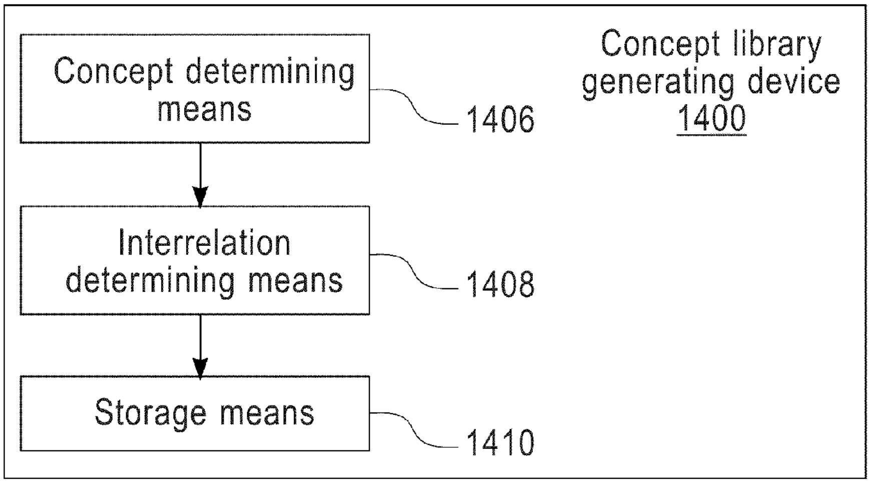
FIG. 14 is a flowchart of a concept library generating device.

A concept library generating device 1400 will be described below. As shown in FIG. 14, the concept library generating device 1400 includes: concept determining means 1406 for determining a core concept and a qualifier concept based on a natural language document sample; interrelation determining means 1408 for determining an interrelation between the qualifier concept and the core concept; and storage means 1410 for storing in association the core concept, the qualifier concept and a relation between the qualifier concept and the core concept as well as corresponding semantic codes.

Both of the concept determining means 1406 and the interrelation determining means 1408 can be configured to operate by manually annotating a natural language document sample 910 or by using a natural language processing technique.

In addition, the concept determining means 1406 can be configured to determine one or more sequenced words or concepts as a concept, or can be configured to determine a plurality of sequenced words or concepts as a plurality of concepts having interrelations.

The concept determining means 1406 can be configured to generate new concepts or new concept relations based on concepts contained in a document sample and determined interrelations among the concepts.

The above mentioned embodiments can be applied to any field requiring semantic information exchange, especially to a clinical document exchanging field to generate a natural language document and a CDA document meeting a CDA standard simultaneously.

CDA (Clinical Document Architecture) is a standard for the clinical document exchange and provides important infrastructure of semantic interoperability. CDA is evolving and is used as the basis for document-based EHR (Electronic Health Record) systems worldwide now. MOH (Ministry of Health) of China also publishes related specifications (for example, electronic medical record) based on CDA. CDA specifies the XML markup of documents and standardizes the document semantics and structure. CDA is based on the HL7 (Health Level 7) Reference Information Model (RIM), the HL7 V3 methodology, and controlled or local vocabularies, for example SNOMED, and LOINC (Logical Observation Identifier Names and Codes).

A CDA document consists of: a header which contains key descriptive information about the document (metadata) such as who wrote the document, whom the document is intended for, and type of the document; and a body which contains the text of the document which can be structured as at least including key headings or sections. The text can contain coded values.

The level of coding is a key factor for CDA: the more that is invested in coding the information contained in the document, the better the reusability of the data whenever the document is exchanged. CDA can be simple or complex as necessary. CDA can be a document with minimal contextual information or be a completely codified document. CDA describes three levels of document definition:

- CDA Level 1 is the most general architecture and can differentiate types of documents, such as “Referral Form” and “Discharge Summary”. Different document type code values are used to differentiate types of documents in the CDA Level 1 document instance.
- CDA Level 2 provides additional constraints on a document by creating distinct templates at the ‘Section’ level for each type of document, such as Emergency Department Discharge Summary and Diagnostic Imaging Report.
- CDA Level 3 provides additional constraints at the ‘Entry’ level and optionally at the ‘Section’ level.

Among the above mentioned three levels of document definitions, the content of the clinical document does not change. Only the content of the clinical document is structured at semantic level, and the degree of being understood and exchanged by the information processing apparatus changes. For a CDA Level 1 document, the information processing apparatus can only identify the type of the clinical document, and do management of the clinical document such as classification and exchange based on the type of the clinical document. However, the information processing apparatus can not understand the contents of various types of documents, let alone perform analysis, statistics, exchange and the like on specific contents. The appreciation and analysis of specific contents still depends on manpower. Compared to the CDA Level 1 document, in addition to identifying the type of document, the CDA Level 2 document can identify the internal structure of a document, such as “personal history”, “family history”, “diagnosis”, and “prescription”, and can conduct, for example, data exchange at this level but can not support, for example, semantic appreciation, processing, exchange for specific content under each part of the document by the information processing apparatus. For example, the information processing apparatus can not appreciate or obtain a health history and corresponding disease times. The problem that the semantic appreciation can not be implemented at the lowest level by CDA Level 1 and CDA Level 2 documents is to be solved in CDA Level 3 document. In the CDA Level 3 document, a natural language statement is codified, stored and exchanged according to a minimal semantic unit (for example, various symptoms such as “weak” and “edema” and anatomic sites such as “limb” and “ear”).

The specification of CDA is complex. It has a steep learning curve and is currently lacking tools to support the CDA level 3 document authoring. In current known solutions to create CDA level 3 documents, one possible way lies in that end user creates the natural language text (equivalent to the natural language document mentioned above) and coded entry (equivalent to the machine-processable document mentioned above) separately. It is required that the end user (such as doctor and nurse) needs to understand and edit the machine-processable coded CDA entry when editing the CDA documents. It is difficult work for the end user, and makes the end user do double work on the same contents.

Another way is that the user creates the natural language text and the invention applies semantic annotation technology to create the coded entries via text analysis and processing. This method has been applied in IBM’s mCHAS (Managing Clinical and Health Records for Analytics and Sharing) solution. Similarly, Generation of Level 3 CDA document using CDA Studio, Sungwon Jung, Jinwook Choi, 2007 International Conference on Convergence Information Technology, as mentioned above, takes the text processing methods based on pattern analysis of a clinical statement to generate CDA entries. These solutions do not necessarily allow the end user to know the way of the CDA entry generation. As the natural language text is input freely by doctors or nurses, the annotation result of the natural language processing technique is not expected to be correct and complete every time. For example, the accuracy of the above referenced document on five-hundred discharge summaries are: 86.5% for diagnosis, 61.8% for chief complaint, 62.7% for problem list and 64.8% for discharge medication.

In view of the above problems, the embodiments of the present invention described above can be applied to CDA document, i.e., can be used to simultaneously edit a natural language text and a codified CDA entry meeting the CDA Level 3 standard corresponding.

Expressions used frequently in practical application situations (for example, expressions often used by doctors and nurses) can be normalized. Technicians can use the concept library generating device 1400 or methods proposed by the present invention to process the text materials abstracted from existing EMR (electronic medical record) or the frequent-used normalized text (for example, the natural language document sample) input by user, abstract the core concept, the qualifier concept and their interrelation and map them into the concept library 1180. Since the CDA standard should be met, the concept library 1180 also should meet the CDA standard. Thus, the concept library 1180 can be based on an existing terminology system, for example, SNOMED and CT (Systematized Nomenclature of Medicine—Clinical Terms). As mentioned above, the concept library generating device 1400 generates the concept library used by the technical solution of the present invention by supplementing or updating the existing terminology system or creating a supplement concept library as a supplement to the existing terminology system separately.

By using the concept library, a CDA template having a standard EMR structure and content is generated by using the template generating device 1200, 1200' or methods provided by the present invention. A user can specify a natural language document sample used frequently (which can be a normalized document sample being marked or not marked in advance), and a template is generated by the template generating device 1200, 1200' based on the document sample and the concept library 1180.

A plurality of templates can be generated with respect to various situations, to constitute the template library 1060. Thus, the end user (such as a doctor or a nurse) can select a needed template from the template library 1060 and edit a natural language document and generate a codified document meeting the CDA standard by using the document processing device 1000 or method provided by the present invention. As mentioned above, the natural language document and the machine-processable codified document are not necessarily two separate documents and can also be combined in one document, for example an XML document.

In addition, the natural language document annotation person and the user of the concept library generating device 1400 and method, the template generating device 1200, 1200' and method and the document processing device 1000 and method can be the same users and can also be different users belong to different entities. For example, it can be that an entity accomplishes the annotation of the natural language document, another entity establishes, maintains and provides the concept library, and yet another entity establishes, maintains and provides the template library, while the end user directly invokes the template library or the concept library, or the natural language document sample to edit the document.

The end user (such as a doctor and a nurse) can implement edition of the natural language document and generation of corresponding machine-processable CDA document with accurate semantics, thus providing possibility for semantic interaction of document in different systems. The end user does not need to understand complicated details of the CDA standard, thus enhancing efficiency.

Invention in Other Fields and Other Embodiments

The above describes application of the embodiments of the invention described, in the CDA document field. It can be understood undoubtedly that the embodiments described can be applied to any other field needing semantic inoperability for document. For example, the embodiments mentioned above can be applied to edit a document which involves appraisal and needs statistics or evaluation of the appraised semantic content, such as appraisal for student by a teacher and appraisal for product by a customer. As another example, the embodiments mentioned above can be further used to provide various appraisal reports.

Several embodiments of the present invention are detailed above. As can be understood by those skilled in the art, all of the methods and apparatuses or any step or component of the present invention can be implemented in any computing apparatus (including a processor and a storage medium) or any computer network in hardware, firmware or combinations of these, which can be implemented by technicians in the art by using their basic programming skills when they have known the contents of the present invention and detailed descriptions thereof are omitted.

In addition, when the above description involves possible external operations, any display apparatus and any input apparatus connected with any computing apparatus, corresponding interfaces and control programs are to be used.

Related hardware and software in a computer, a computer system or a computer network and hardware, firmware, software or their combinations implementing various operations in the above mentioned methods of the present invention constitute the apparatuses and components of the present invention.

The object of the present invention can be further achieved by running a program or a group of programs on any information processing apparatus. The information processing apparatus can be a well-known apparatus. The object of the present invention can also be achieved by only providing program products containing the semantic codes implementing the program of the methods or apparatuses. Such program products also constitute a part of the present invention, and storage media storing such program products also constitute a part of the present invention. The storage media can be any kind of storage media already known by those skilled in the art or to be developed in the future, including but not being limited to floppy disks, optical disks, magneto optical disks, storage cards, and storage sticks.

In the apparatuses and methods of the present invention, the components or steps can be disassembled, combined or recombined after disassembly. The disassembly or recombination should be regarded as equivalent schemes of the present invention.

The steps for executing above series of processing can be executed in sequence according to the description order, but the present invention is not limited to the sequence as described. Some steps can be executed in parallel or independently.

In addition, although the above description is provided one embodiment by one embodiment, it is to be understood that the embodiments are not isolated. Those skilled in the art can understand, after reading the present specification, that the various technical features contained in the embodiments can be combined arbitrarily among the embodiments, as long as there is no conflict among them. All technical features mentioned in a same embodiment can also be combined arbitrarily with each other, as long as there is no conflict among them.

The terms "including/include", "comprising/comprise" "containing/contain" and other variants intend to cover non-exclusive inclusion, thus making a procedure, a method, an article or an apparatus including a series of key elements not only include key elements as described but also include other key elements that are not explicitly listed, or further include key elements inherent to the procedure, the method, the article or the apparatus. In addition, in the case that there is no more restriction, key elements defined by "including a . . . " do not exclude additional key elements existed in the procedure, method, article or apparatus including the key elements.

While the embodiments and advantages thereof have been detailed in conjunction with the drawings, it is to be understood that the embodiments mentioned above are only used to illustrate the present invention, instead of constituting a restriction to the present invention. Those skilled in the art can make various variants and changes with respect to the embodiments without departing from the essence and scope of the present invention. Therefore, the scope of the present invention is only defined by the attached claims and their equivalents, and various changes, alternations and substitutions can be made without going beyond the spirit and scope of the present invention defined by the attached claims.

The invention claimed is:

1. An electronic document processing method, comprising steps of:

acquiring an electronic template comprising a set of semantic items, wherein (i) candidate values of the set of semantic items and relations among a plurality of semantic items in the set of semantic items are associated with one or more electronic semantic codes, and (ii) the electronic template is associated with a natural language expression mode;

receiving an electronic input value for at least one semantic item in the set of semantic items, wherein the electronic input value comprises one or more constituent values;

generating a first electronic document comprising (i) a first set of electronic semantic codes corresponding to the electronic input value, (ii) the relations among the plurality of semantic items, and (iii) a second set of electronic semantic codes corresponding to the relations among the plurality of semantic items; and generating, based on the electronic input value and based on the natural language electronic expression mode, a second electronic document comprising the electronic input value.

2. The method of claim 1, wherein receiving the electronic input value comprises:

displaying an electronic input interface of the set of semantic items; and receiving the electronic input value via the electronic input interface.

3. The method of claim 2, wherein displaying the electronic input interface comprises:

identifying a core concept in the electronic template;

identifying an interrelation between one or more semantic items in the set of semantic items and the core concept;

acquiring a qualifier concept from an electronic concept library, wherein an interrelation between the qualifier concept and the core concept is identical to the interrelation between the one or more semantic items and the core concept; and generating, based on the qualifier concept, the electronic input interface for inputting the electronic input value.

4. The method of claim 1, wherein receiving the electronic input value comprises receiving the electronic input value from an external apparatus.

5. The method of claim 1, wherein acquiring the electronic template comprises acquiring the electronic template from an external apparatus.

6. The method of claim 1, wherein acquiring the electronic template comprises constructing the electronic template according to a natural language pattern.

7. The method of claim 1, wherein acquiring the electronic template comprises replacing a variable sentence element in a natural language electronic document sample with a semantic item of the electronic template to form the electronic template.

8. The method of claim 1, wherein at least one portion of the electronic document is generated based on a clinical document architecture (CDA) standard.

9. The method of claim 1, wherein the electronic template is generated from a natural language electronic document sample by a method comprising steps of:

identifying, based on the natural language electronic document sample, a core concept and one or more sentence elements;

determining a relation between a current concept of the one or more sentence elements and the core concept;

searching in an electronic concept library for a qualifier concept, wherein a relation between the qualifier concept and the core concept is identical to the relation between the current concept and the core concept;

generating, based on searching the electronic concept library, the set of semantic items of the electronic template; and generating, based on the qualifier concept, the candidate values of the set of semantic items.

10. The method of claim 9, wherein generating the set of semantic items comprises:

selecting, as a semantic item, an interested sentence element from among the sentence elements, wherein the interested sentence element corresponds to at least one qualifier concept determined based on searching the electronic concept library, and wherein the at least one qualifier concept has candidate value options identical to candidate value options of the interested sentence element; and replacing one or more sentence elements other than the interested sentence elements with semantic items having no candidate value option.

11. The method of claim 1, wherein the electronic template is generated from a natural language electronic document sample, by a method comprising steps of:

displaying the natural language electronic document sample via an electronic display device;

selecting an interested sentence element in the natural language electronic document sample as a core concept and as a semantic item in the set of semantic items of the electronic template;

determining a relation between a current concept of one or more semantic items in the set of semantic items, and the core concept;

searching in a concept library for a qualifier concept, wherein a relation between the qualifier concept and the core concept identical to the relation between the current concept and the core concept; and generating, based on the qualifier concept, candidate values of the one or more semantic items in the set of semantic items.

12. The method of claim 9, wherein generating the candidate values of the set of semantic items comprises selecting candidate values from among the qualifier concept and the current concept.

13. The method of claim 3, wherein generating an electronic concept library comprises:

determining, based on a natural language electronic document sample, the core concept and the qualifier concept;

determining a relation between the qualifier concept and the core concept; and storing in association with one another: (i) the core concept, (ii) the qualifier concept, (iii) the relation between the qualifier concept and the core concept, and (iv) semantic codes corresponding to (i)-(iii).

14. A document processing device, comprising:

means configured to acquire a template comprising a set of semantic items, wherein (i) candidate values of the set of semantic items and relations among a plurality of semantic items in the set of semantic items are associated with one or more semantic codes, and (ii) the template is associated with a natural language expression mode;

semantic item input means configured to receive an input value for at least one semantic item in the set of semantic items, wherein the input value comprises one or more constituent values;

machine-processable document generating means configured to generate a first document comprising (i) a first set of semantic codes corresponding to the input value, (ii) the relations among the plurality of semantic items, and (iii) a second set of semantic codes corresponding to the relations among the plurality of semantic items; and natural language document generating means configured to generate, based on the input value and based on the natural language expression mode, a second document comprising the input value.

15. The device of claim 14, wherein the semantic item input means comprises:

means configured to display an input interface of the set of semantic items; and means configured to receive the input value via the input interface.

16. The device of claim 15, wherein means for displaying the input interface comprises:

means configured to identify a core concept in the template;

means configured to identify an interrelation between one or more semantic items in the set of semantic items and the core concept;

means configured to acquire a qualifier concept from a concept library, wherein an interrelation between the qualifier concept and the core concept is identical to the interrelation between the one or more semantic items and the core concept; and means configured to generate, based on the qualifier concept, the input interface for inputting the input value.

17. The device of claim 14, further comprising means for generating the template from a natural language document sample, said means comprising:

means configured to identify, based on the natural language document sample, a core concept and one or more sentence elements;

means configured to determine a relation between a current concept of the one or more sentence elements and the core concept;

means configured to search in an concept library for a qualifier concept, wherein a relation between the qualifier concept and the core concept is identical to the relation between the current concept and the core concept;

means configured to generate, based on searching the concept library, the set of semantic items of the template; and means configured to generate, based on the qualifier concept, the candidate values of the set of semantic items.

18. The device of claim 14, further comprising means for generating the template from a natural language document sample, said means comprising:

means configured to display the natural language document sample via a display device;

means configured to select an interested sentence element in the natural language document sample as a core concept and as a semantic item in the set of semantic items of the template;

means configured to determine a relation between a current concept of one or more semantic items in the set of semantic items, and the core concept;

means configured to search in a concept library for a qualifier concept, wherein a relation between the qualifier concept and the core concept identical to the relation between the current concept and the core concept; and means configured to generate, based on the qualifier concept, candidate values of the one or more semantic items in the set of semantic items.

19. The device of claim 16, wherein generating a concept library comprises:

means configured to determine, based on a natural language document sample, the core concept and the qualifier concept;

means configured to determine a relation between the qualifier concept and the core concept; and means configured to store in association with one another: (i) the core concept, (ii) the qualifier concept, (iii) the relation between the qualifier concept and the core concept, and (iv) semantic codes corresponding to (i)-(iii).

20. A non-transitory computer readable article of manufacture tangibly embodying computer readable instructions which when executed causes a computer to carry out a document processing method, comprising steps of:

acquiring an electronic template comprising a set of semantic items, wherein (i) candidate values of the set of semantic items and relations among a plurality of semantic items in the set of semantic items are associated with one or more electronic semantic codes, and (ii) the electronic template is associated with a natural language expression mode;

receiving an electronic input value for at least one semantic item in the set of semantic items, wherein the electronic input value comprises one or more constituent values;

generating a first electronic document comprising (i) a first set of electronic semantic codes corresponding to the electronic input value, (ii) the relations among the plurality of semantic items, and (iii) a second set of electronic semantic codes corresponding to the relations among the plurality of semantic items; and generating, based on the electronic input value and based on the natural language electronic expression mode, a second electronic document comprising the electronic input value.

* * * * *